United States Patent [19]
Takano et al.

[11] Patent Number: 5,600,630
[45] Date of Patent: Feb. 4, 1997

[54] PATH CHANGING SYSTEM AND METHOD FOR USE IN ATM COMMUNICATION APPARATUS

[75] Inventors: Masataka Takano; Yoji Oka, both of Yokohama; Akihiko Takase, Tokyo; Setsuo Takahashi, Yokohama, all of Japan

[73] Assignees: Hitachi, Ltd., Tokyo; Hitachi Communication Systems, Inc., Yokohama, both of Japan

[21] Appl. No.: 296,334

[22] Filed: Aug. 25, 1994

[30] Foreign Application Priority Data

Aug. 31, 1993 [JP] Japan .................................. 5-215485

[51] Int. Cl.⁶ .............................. H04J 3/14; H04L 12/56
[52] U.S. Cl. ................................. 370/218; 370/397
[58] Field of Search .......................... 370/16, 60.1, 94.1, 370/94.2, 60, 94.3, 54; 371/8.1, 8.2, 11.1, 11.2

[56] References Cited

U.S. PATENT DOCUMENTS

| | | | |
|---|---|---|---|
| Re. 34,305 | 7/1993 | Sakurai et al. | 370/67 |
| 4,884,263 | 11/1989 | Suzuki | 370/16 |
| 5,016,243 | 5/1991 | Fite, Jr. | 370/16 |
| 5,084,867 | 1/1992 | Tachibana et al. | 370/54 |
| 5,093,824 | 3/1992 | Coan et al. | 370/16 |
| 5,239,537 | 8/1993 | Sakauchi | 370/16 |
| 5,241,534 | 8/1993 | Omuro et al. | 370/16 |
| 5,295,134 | 3/1994 | Yoshimura et al. | 370/16 |
| 5,301,184 | 4/1994 | Uriu et al. | 370/60.1 |

FOREIGN PATENT DOCUMENTS

| | | |
|---|---|---|
| 2-001669 | 1/1990 | Japan . |
| 2-090834 | 3/1990 | Japan . |
| 4-088738 | 3/1992 | Japan . |
| 4-156139 | 5/1992 | Japan . |
| 5-003489 | 1/1993 | Japan . |

OTHER PUBLICATIONS

NEC Technical Report, Mar. 1990, pp. 9–15. (Japanese) An English Translation for the Relevant Portion of the Japanese Document (See Portion Indicated in Red) is Provided Herewith.

*Primary Examiner*—Douglas W. Olms
*Assistant Examiner*—Min Jung
*Attorney, Agent, or Firm*—Fay Sharpe Beall Fagan Minnich & McKee

[57] ABSTRACT

An ATM path changing system and method for use in an ATM communication apparatus and ATM communication network are provided which can set an alternating route in the event of a failure occurring in a transmission line or VP. A header converter in a line controller includes a plurality of output path routing tables, a selector, a comparator, a register for failure RTG and a register for failure VPI and when the contents of the register for failure RTG or VPI coincides with a RTG or VPI of the output path routing tables, an output is selected in accordance with the contents of a selected emergency-route RTG or VPI register.

40 Claims, 21 Drawing Sheets

FIG. 13A

| ADDRESS | DATA | | |
|---|---|---|---|
| 0 | RTG$_2$ | VPI$_{21}$ | --- |
| 41 ⋮ | ⋮ | ⋮ | |
| n | RTG$_n$ | VPI$_{mm}$ | --- |

FIG. 13B

| ADDRESS | DATA | | |
|---|---|---|---|
| 0 | RTG$_3$ | VPI$_{31}$ | --- |
| 42 ⋮ | ⋮ | ⋮ | |
| n | RTG$_x$ | VPI$_{yy}$ | --- |

FIG. 14

| ADDRESS | DATA | | |
|---|---|---|---|
| 0 | RTG$_2$ | VPI$_{21}$ | --- |
| ⋮ | ⋮ | ⋮ | |
| n | RTG$_n$ | VPI$_{mm}$ | --- |
| n+1 | RTG$_3$ | VPI$_{31}$ | --- |
| ⋮ | ⋮ | ⋮ | |
| n+n | RTG$_x$ | VPI$_{yy}$ | --- |

ATM COMMUNICATION APPARATUS A

| ADDRESS | DATA | |
|---|---|---|
| | RTG | VPI |
| 0 | | |
| 1 | B | 4 |
| 2 | B | 5 |
| 3 | D | 6 |
| ...... | | |
| 255 | | |

FIRST ROUTING TABLE

FIG. 19B

| ADDRESS | DATA | |
|---|---|---|
| | RTG | VPI |
| 0 | | |
| 1 | | |
| 2 | B | 10 |
| 3 | | |
| ...... | | |
| 255 | | |

SECOND ROUTING TABLE

FIG. 19C

ATM COMMUNICATION APPARATUS B

| ADDRESS | DATA | |
|---|---|---|
| | RTG | VPI |
| 0 | | |
| ...... | | |
| 4 | C | 8 |
| 5 | E | 20 |
| ...... | | |
| 10 | C | 8 |
| ...... | | |
| 255 | | |

FIG. 19D

| ADDRESS | DATA | |
|---|---|---|
| | RTG | VPI |
| 0 | | |
| ...... | | |
| 4 | D | 7 |
| ...... | | |
| 255 | | |

FIG. 19E

ATM COMMUNICATION APPARATUS D

| ADDRESS | DATA | |
|---|---|---|
| | RTG | VPI |
| 0 | | |
| ...... | | |
| 6 | F | 21 |
| 7 | C | 9 |
| ...... | | |
| 255 | | |

FIG. 19F

| ADDRESS | DATA | |
|---|---|---|
| | RTG | VPI |
| 0 | | |
| ...... | | |
| 255 | | |

| | |
|---|---|
| 1ST OCTET | VPI |
| 2ND OCTET | VPI / VCI |
| 3RD OCTET | VCI |
| 4TH OCTET | VCI |
| 5TH OCTET | |
| 6TH OCTET | PAYLOAD |
| ⋮ | ⋮ |
| 53RD OCTET | PAYLOAD |

| | |
|---|---|
| 1ST OCTET | RTG |
| 2ND OCTET | VPI |
| 3RD OCTET | VPI / VCI |
| 4TH OCTET | VCI |
| 5TH OCTET | VCI |
| 6TH OCTET | |
| 7TH OCTET | PAYLOAD |
| ⋮ | ⋮ |
| 54TH OCTET | PAYLOAD |

PATH CHANGING SYSTEM AND METHOD FOR USE IN ATM COMMUNICATION APPARATUS

BACKGROUND OF THE INVENTION

The present invention relates to setting an alternating route (detour) in an ATM communication apparatus which realizes the function of multiplexing or switching and more particularly to ATM path changing method and system for realization of changing a transmission path or a virtual path (hereinafter referred to as VP) at a high speed.

In a conventional ATM communication network, for the sake of changing a transmission line or a VP, a method is employed as described in JP-A-2-90834, according to which an information table is retrieved on the basis of information of a cell header, an output (or outgoing) transmission line or path is selected and the function of concentration or cross-connect is realized; and besides the output transmission line or path is changed by causing the central processing unit to rewrite the information table and thereafter retrieve the renewed table. A method for change of transmission line is described in NEC Technical Report (March 1990, pp.9–15), according to which an emergency transmission line is provided and in the event that a failure occurs in a normal route, changing to the transmission line of an emergency route is effected after detection of the failure by means of a switch included in the system.

Further, U.S. Pat. No. 5,093,824 discloses a method in which in the event of the occurrence of a failure, a node detecting this failure prepares a message, the message is transmitted from one node to another to flood the network with the message so as to inform each node of a network topology, whereby the individual nodes are allowed to have in common a correct state which makes the precedently owned network topology coincident with each other so as to reconstruct the connection of the network, thereby avoiding the failure.

JP-A-4-88738, JP-A-4-156139 and JP-A-5-3489 disclose alternating (detouring) operations.

SUMMARY OF THE INVENTION

The conventional hot-stand-by method as above always needed the emergency transmission line to improve the reliability and was not economical. Also, when the transmission line is not made to be duplex, the output (or outgoing) routing table must be rewritten such that header information of a fixed-length packet is rewritten so as to deliver the fixed-length packet to an output alternating transmission line or path. Accordingly, when the communication network is managed centrally by a network management center (NMC), the output routing table of very large capacity which is included in an ATM communication apparatus of interest must be rewritten after transmission line or path failure information has been recognized by the NMC and much time is taken for this to proceed, raising a problem that the time for interrupting communication is prolonged. Even if the central processing unit included in the ATM communication apparatus and operative to detect a transmission line or path failure performs a processing for determining a transmission line to be changed after recognition of the failure and resetting the output routing table of very large capacity included in the apparatus, the path is interrupted for the time taken for the output routing table to be rewritten and disadvantageously highly reliable services cannot be offered.

Further, in the method shown in U.S. Pat. No. 5,093,824, a failure state is transmitted from one node to another and disadvantageously the time taken for the network to be reconstructed is prolonged.

A first object of the present invention is to provide high-speed and economically constructed ATM path changing method and system which can realize changing to an alternating transmission line within a short period of time in the event of a failure occurring in a transmission line by eliminating the necessity of rewrite of the output (or outgoing) routing table and minimizing a processing carried out through the central processing unit or the NMC.

A second object of the present invention is to provide high-speed and economically constructed ATM path changing method and system which can realize changing to an alternating path within a short period of time in the event of the occurrence of failure in a path.

A third object of the present invention is to provide high-speed and economically constructed ATM path changing method and system which can realize changing to an alternating transmission line or path even in the event of a failure occurring in a transmission line or a path.

A fourth object of the present invention is to provide high-speed and economically constructed ATM path changing method and system which can realize changing to an alternating transmission line or path even in the event of a failure occurring in a transmission line or a path without resort to the provision of a plurality of failure information registers.

A fifth object of the present invention is to provide high-speed and economically constructed ATM path changing method and system which can realize changing to alternating transmission lines or paths even in the event of failures occurring in a plurality of transmission lines or paths.

A sixth object of the present invention is to provide high-speed and economically constructed ATM path changing method and system which can realize changing to alternating transmission lines or paths even in the event of failures occurring in a plurality of transmission lines or paths without resort to the provision of a plurality of output routing tables.

A seventh object of the present invention is to provide high-speed and economically constructed communication network changing method and system which can realize communication in a communication network, comprised of a plurality of communication apparatus, a managing apparatus for managing the plurality of communication apparatus and transmission lines, in the event of a failure occurring in a transmission line or a path by taking an alternating transmission line or path.

The above first object can be accomplished by providing, in a header converter, a plurality of routing tables, a register for failure RTG adapted to set failure internal routing information RTG of system, a comparator for comparing the contents of the register for failure RTG with the internal routing information of system indicative of transmission line routing information and a selector for selecting the contents of one of the first and second routing tables, by setting a RTG corresponding to a failure transmission line in the event of the occurrence of a failure in the transmission line in the register for failure RTG, and by replacing an output (or outgoing) cell header with the contents of the second routing table when the set RTG coincides with a RTG contained in the contents of the internal routing information of system of the first routing table.

The above second object can be accomplished by replacing the register for failure RTG with a register for failure path and similarly replacing the output header with the contents of the second routing table when the set path coincides with a path of the first routing table.

The above third object can be accomplished by providing a register for failure RTG and a register for failure path separately, providing comparators and selectors in association with the individual registers and similarly replacing the output cell header with the contents of the second routing register when the set RTG or path coincides with a RTG or path of the first routing table.

The above fourth object can be accomplished by making the register for failure RTG settable also with a failure path and similarly replacing the output header with the contents of the second routing register when the set path coincides with a path of the first routing table.

The above fifth object can be accomplished by providing a plurality of registers for failure RTG and for failure path in the form of a table or by providing a common register for setting failure RTG and failure path and having an identification bit for effecting a changing of a transmission line or a path.

The above sixth object can be accomplished by providing the first and second routing tables in the same memory and performing reading of the memory twice.

The above seventh object can be accomplished by constructing a communication network by a plurality of communication apparatus which can achieve any one of the above first to sixth objects, a management apparatus for managing the plurality of communication apparatus and transmission lines.

Since a plurality of routing tables and a table for failure RTG or for failure VP are provided in a header converter and the function of consulting an output path routing table for changing path is obtained by setting a failure RTG or failure VP, the central processing unit is required in the event of the occurrence of a failure to perform only the processing of recognition of failure information and setting of the failure information in the table for failure RTG or failure VP is not required to reset all of the output routing tables in the line controller which set a failure path in the output, thus realizing shortening of the path changing time. Also, since the network management apparatus sets a routing table in each ATM communication apparatus in advance, there is no need of resetting the routing tables of all of the ATM communication apparatus which designate a failure transmission line or VP to the output route in the event of a failure in the transmission line or VP. In other words, a large amount of table information need not be transferred from the network managing apparatus and therefore shortening of the path changing time can be realized.

BRIEF DESCRIPTION OF THE DRAWINGS

FIGS. 13A and 13B are diagrams showing memory maps of routing tables in the FIG. 11 circuit.

FIG. 14 is a diagram showing a memory map of a routing table in the FIG. 12 circuit.

FIGS. 19A to 19F are diagrams showing memory maps of header converter tables in the individual ATM communication apparatus of FIG. 18.

DESCRIPTION OF THE PREFERRED EMBODIMENTS

Before describing path changing system and method according to the present invention in detail, the construction of an ATM communication apparatus presupposed by the present invention will first be described.

Figure 20:
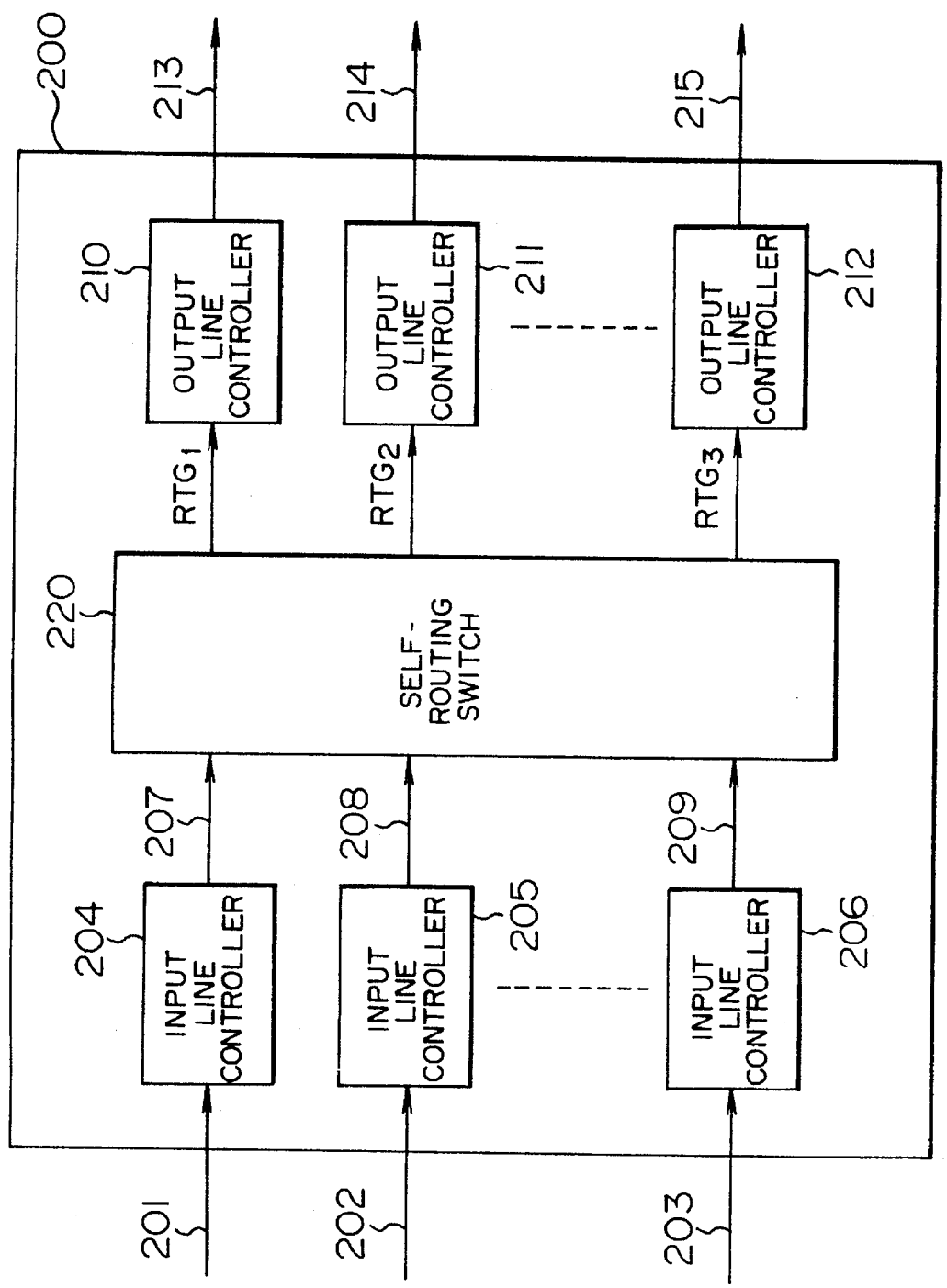
FIG. 20 is a block diagram showing the overall construction of an ATM communication apparatus presupposed by the present invention.

In an ATM communication apparatus 200 constructed as shown in FIG. 20, input lines 201, 202 and 203 and output lines 213, 214 and 215 are connected to another ATM communication apparatus to perform transmission and reception of an ATM cell.

Each transmission line contains a plurality of virtual paths and each virtual path contains a plurality of virtual channels. For identification of a virtual path and a virtual channel, an ATM cell to be transferred on a transmission line contains a virtual path identifier (VPI) and a virtual channel identifier (VCI).

An input line controller 204, 205 or 206 extracts information, necessary for selection of an output line, from VPI and VCI numbers of an ATM inputted from the input line 201, 202 or 203 and performs conversion of the VPI and VCI numbers. Then, the input line controller 204, 205 or 206 delivers to internal interface 207, 208 or 209 of system the ATM cell which is added with internal routing information of system (RTG) provided for efficiently performing selection of an output line.

A self-routing switch 220 analyzes the RTG of the ATM cell received from the internal interface 207, 208 or 209 of system and selects a route to an output line controller 210, 211 or 212 inserted in the output line 213, 214 or 215.

By providing pieces of the internal routing information (RTG) of system by the number corresponding to the number of lines contained in the ATM communication apparatus, the analysis time can be more shortened and the scale of an analysis circuit can be more reduced than in the case where VPI and VCI are analyzed to perform route selection. The internal routing information of system is described in detail in U.S. Pat. No. Re. 34,305 (corresponding to JP-A-2-1669) the disclosure of which is hereby incorporated by reference.

The output line controller 210, 211 or 212 deletes the internal routing information (RTG) of system from the ATM cell received from the self-routing switch 220 and delivers a resulting ATM cell to the output line 213, 214 or 215.

Figures 21, 22, 23:
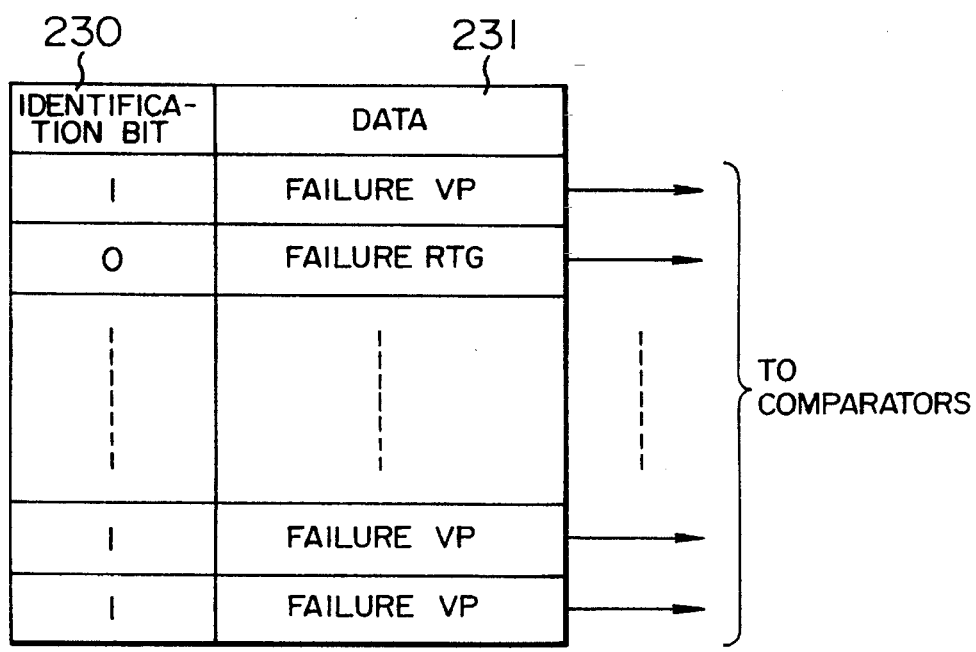
FIG. 21 is a diagram showing the structure of an AMT cell on a transmission line in the ATM communication apparatus of FIG. 20.
FIG. 22 is a diagram showing the structure of an AMT cell in the ATM communication apparatus of FIG. 20.
FIG. 23 is a diagram showing the construction of a register for failure used in the FIG. 11 embodiment.

FIG. 21 shows the structure of the ATM cell on the transmission line and FIG. 22 shows the structure of the ATM cell in the ATM communication apparatus.

Figure 4:
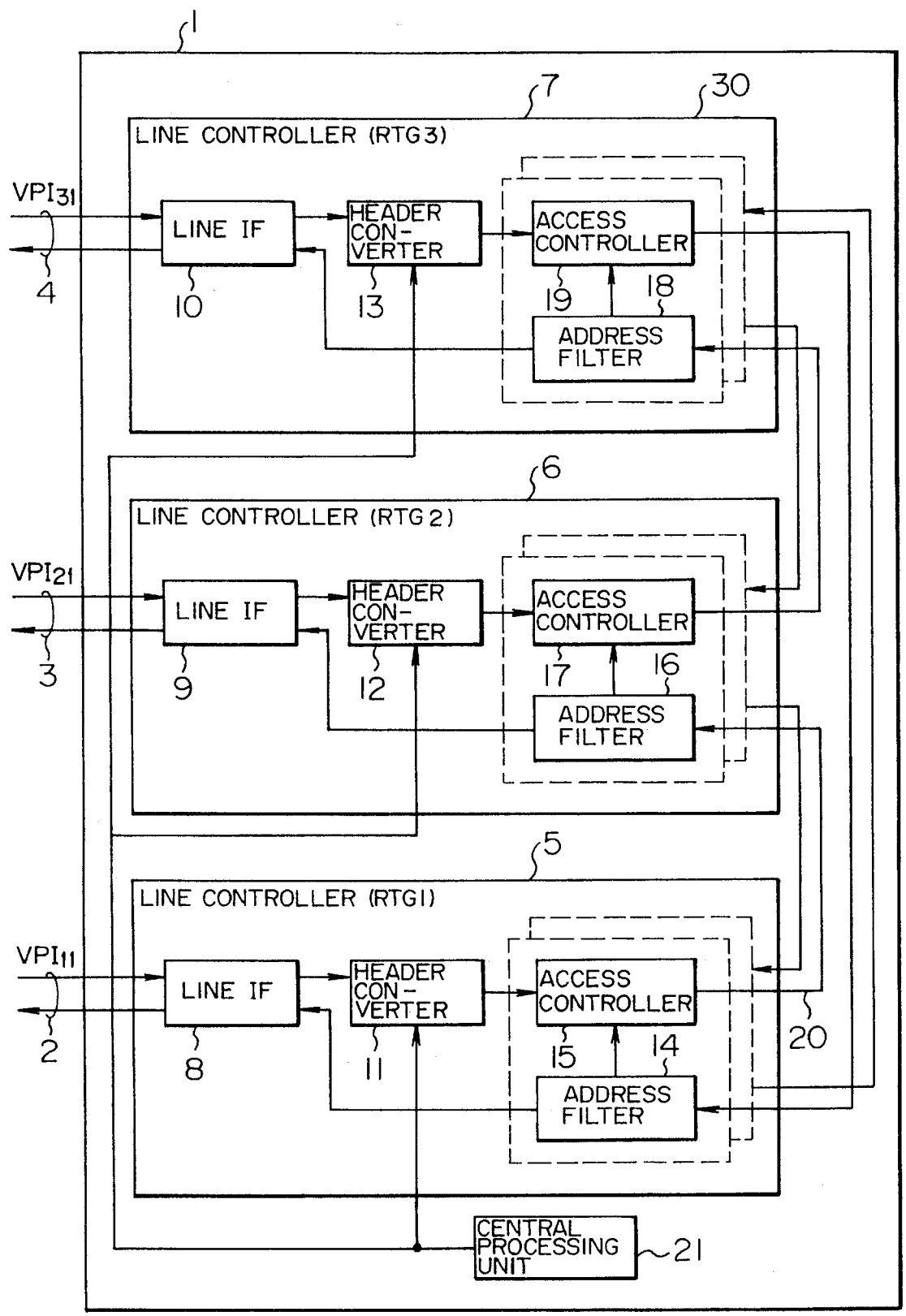
FIG. 4 is a block diagram of an ATM communication apparatus useful to explain the present invention.

FIG. 4 is a block diagram of the ATM communication apparatus, depicting the line controller in the FIG. 20 ATM communication apparatus in greater detail. Referring to FIG. 4, an example of an ATM communication apparatus 1 of the present invention devoid of a path changing system of the present invention will be described.

In the Figure, lines represented by transmission lines 2 to 4 are connected to another ATM communication apparatus to perform transmission and reception of an ATM cell. A line controller 5, 6 or 7 connected to each transmission line is assigned with internal routing information (RTG 1, 2 or 3) of system. Each transmission line contains a plurality of virtual paths, each virtual path is assigned with a virtual path identifier (VPI), output line routing information (output RTG number and output VPI number) corresponding to an input VPI number written at the VPI is determined by a central processing unit 21, and the output line routing information is transferred to the line controller so as to be stored in a header converter inside the line controller.

An ATM cell inputted from the transmission line 2 (VPI 11) and destined for the transmission line 3 (VPI 21) is subjected to interface conversion by means of a line-interface (hereinafter referred to as a line IF) 8 standing for an interface which terminates the line inside the line controller 5 and thereafter output line routing information (RTG 2 and VPI 21) are extracted by means of a header converter 11 on the basis of the input VPI 11 so that the inputted ATM cell may be converted into an ATM cell added with the output line routing information in place of the input VPI 11. The thus converted ATM cell is transmitted to an internal bus 20 of system through an access controller 15 for controlling the timing of transmission to the internal bus of system.

In the line controller 6, on the other hand, the ATM cell inputted from the internal bus 20 of system is subjected to a comparison in which internal routing information of system of the inputted ATM cell is compared with internal routing information of system assigned to the line controller. When the two pieces of information coincide with each other, the ATM cell destined for the transmission line 3 and monitored by an address filter 16 for transmission of the inputted ATM cell to the line IF is extracted and internal routing information of system (RTG 2) is deleted, with the result that the ATM cell is transmitted to the transmission line 3 through a line IF 9.

In the event that a failure occurs in the transmission line 3, failure information is transferred from the line controller 6 to the central processing unit 21, which recognizes the failure in the transmission line 3. The central processing unit 21 identifies a line controller dealing with a call connected to the transmission line 3 (line controller 5 in the present case) and transfers changed output line routing information (RTG 3 and VPI 31) to that line controller.

Figure 5:
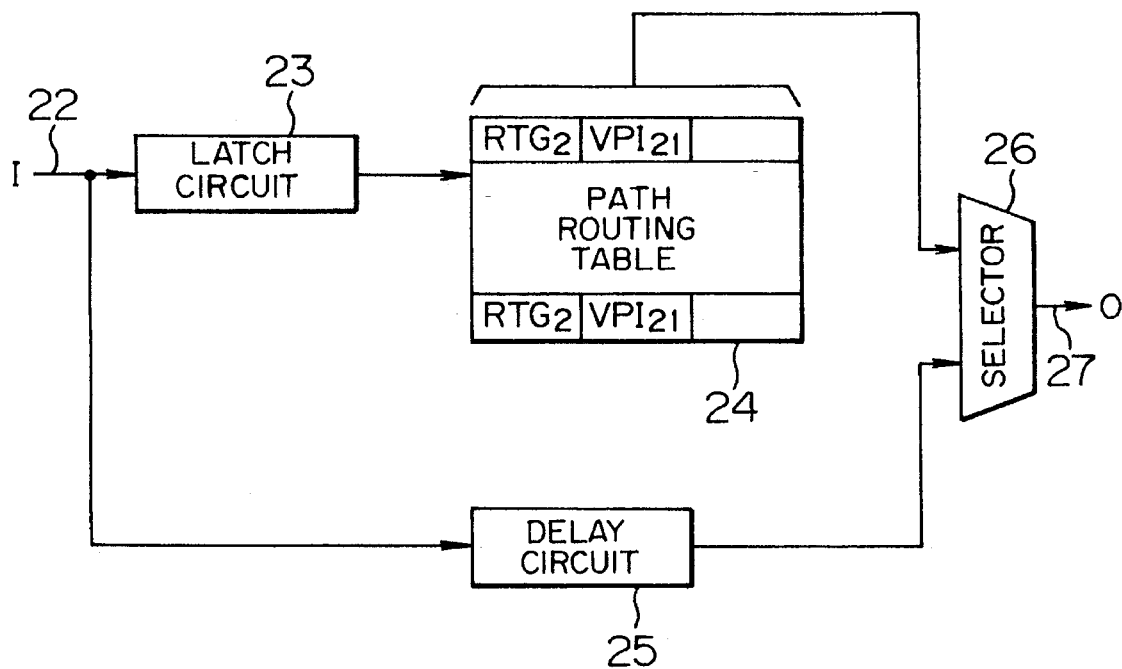
FIG. 5 is a block diagram of a header converter circuit in the FIG. 4 ATM communication apparatus.
Figure 6:
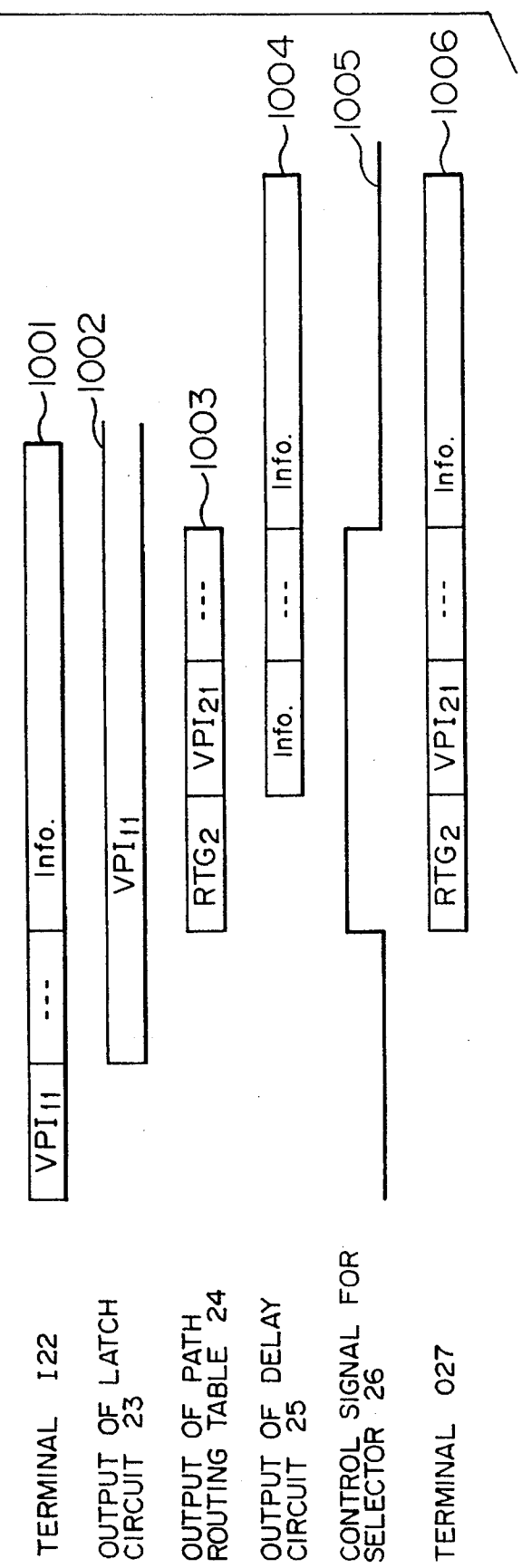
FIG. 6 is a time chart for explaining the operation of the FIG. 5 circuit.

FIG. 5 shows the circuit construction of header converters 11, 12 or 13 inside the line controllers 5, 6 or 7 in the ATM communication apparatus shown in FIG. 4, and FIG. 6 is a time chart for explaining the operation of the circuit shown in FIG. 5. An ATM cell from the input line is applied to a latch circuit 23 and a delay circuit 25 through a terminal I 22 (1001 in FIG. 6). The latch circuit 23 latches a VPI number of the input ATM cell. An output of the latch circuit 23 (1002 in FIG. 6) is connected to a routing table 24 and the contents of the routing table corresponding to the VPI number of the input ATM cell is read (1003 in FIG. 6). The contents of the routing table 24 contains output line routing information and is set by the central processing unit 21 as described in connection with FIG. 4. The output line routing information read out of the routing table 24 is applied to a selector 26. The selector 26 transmits the contents of the routing table to a terminal 0 27 for a period of transmission of the output line routing information but transmits an output of the delay circuit 25 to the terminal 0 27 for the other period (1005 and 1006 in FIG. 6). The delay circuit 25 is adapted to delay the ATM cell for a time beginning with the application of the ATM cell to the header converter and ending with the delivery of the adding output line routing information from the selector 26 (1004 in FIG. 6).

Through the operation described as above, the input ATM cell is converted into an ATM cell added with the output line routing information.

Figure 17:
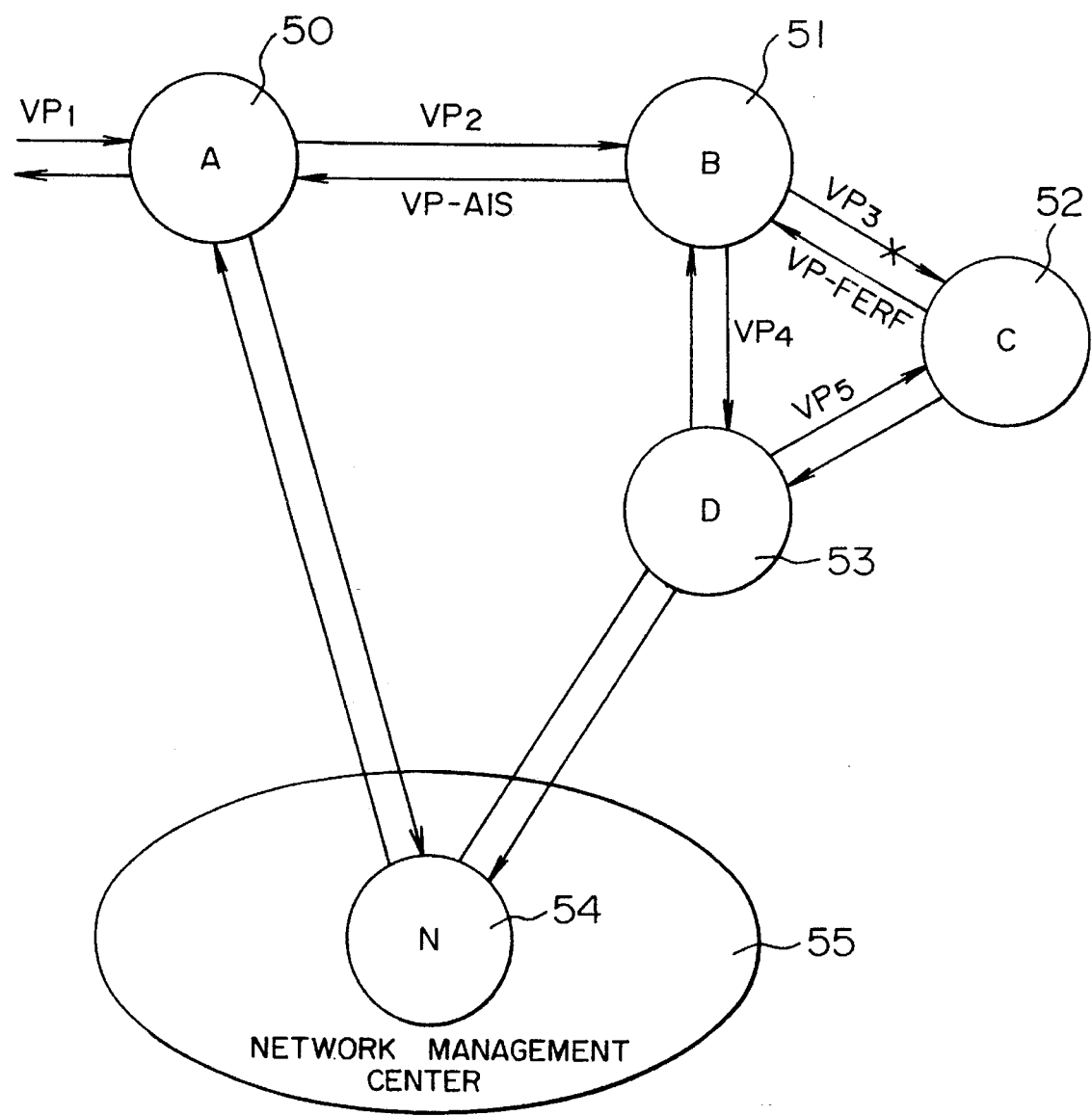
FIG. 17 is a diagram showing the construction of a conventional network in which a plurality of ATM communication apparatus are managed centrally by a network management center.

Turning to FIG. 17, the operation of a conventional ATM communication network in which a plurality of ATM communication apparatus are managed centrally by means of a network management center.

In FIG. 17, ATM communication apparatus A 50, B 51, C 52 and D 53 are managed centrally by a network management center 55 including an ATM communication apparatus N 54. Only the ATM communication apparatus A 50 and D 53 are connected directly to the ATM communication apparatus N 54. In the ATM communication apparatus, VP information is converted from an input VP to an output VP. For example, it is now assumed that a VP 1 received by the ATM communication apparatus A 50 reaches the ATM communication apparatus C 52 through the ATM communication apparatus B 51 (converted to VP 2 and then VP 3). At that time, in the event that a failure occurs in a transmission line between the ATM communication apparatus B 51 and the ATM communication apparatus C 52, VP-FERF serving as failure information is transmitted from ATM communication apparatus C 52 to ATM communication apparatus B 51. Responsive thereto, VP-AIS serving as alarm information is transmitted from ATM communication apparatus B 51 to ATM communication apparatus A 50. The failure is transferred to the network management center 55 through the ATM communication apparatus D 53. In this case, in order to take an alternating transmission line for the failure transmission line between the ATM communication apparatus B 51 and C 52, the ATM communication apparatus N 54 of the network management center 55 must analyze the failure information and thereafter transfer information about the alternating to header converter tables of the ATM communication apparatus B 51 and D 53.

Embodiments of path changing method and system according to the present invention will now be described in greater detail.

Figure 1:
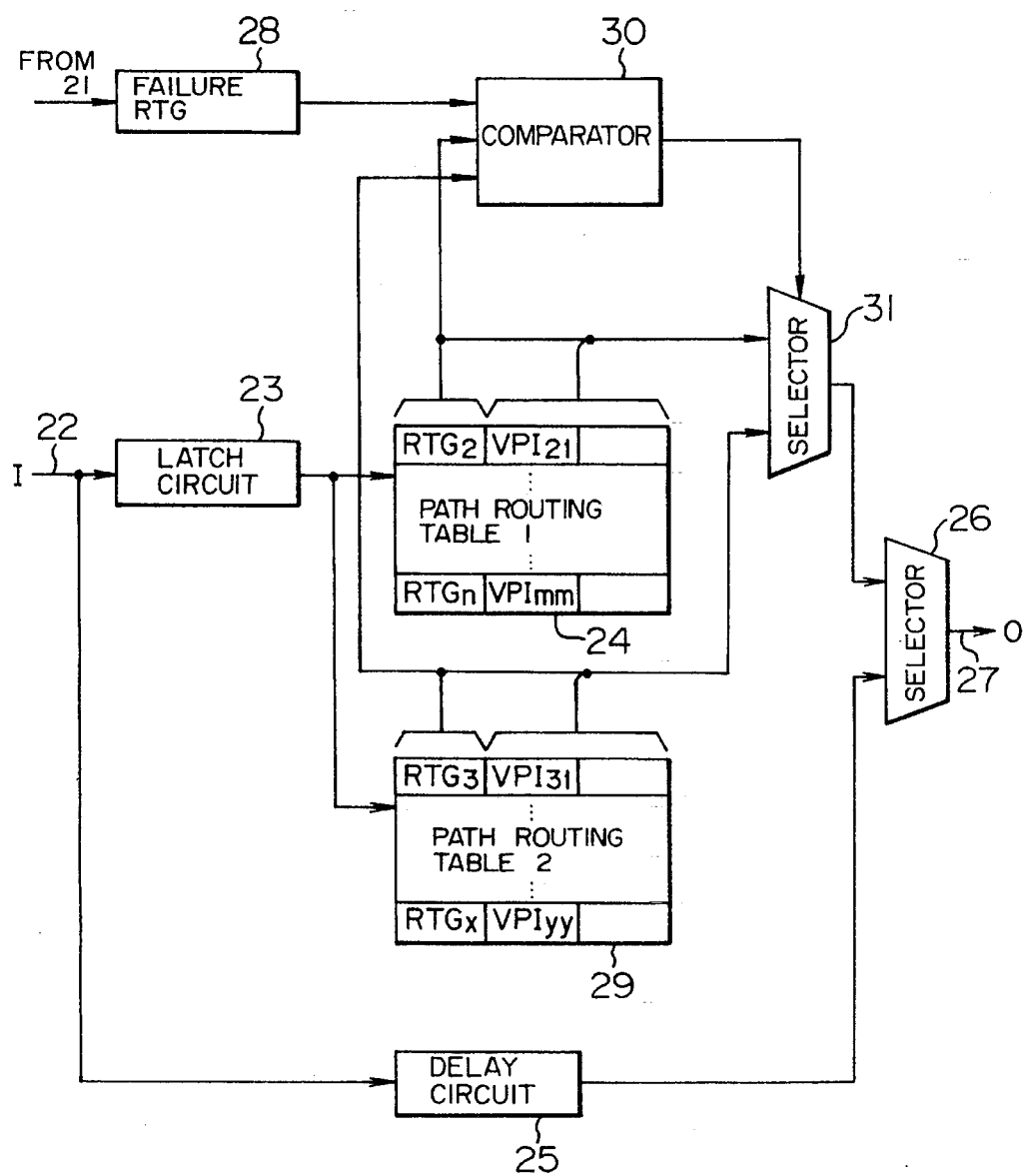
FIG. 1 is a block diagram showing the circuit construction of a first embodiment of a header converter in a line controller in a path changing system according to the present invention.
Figure 2:
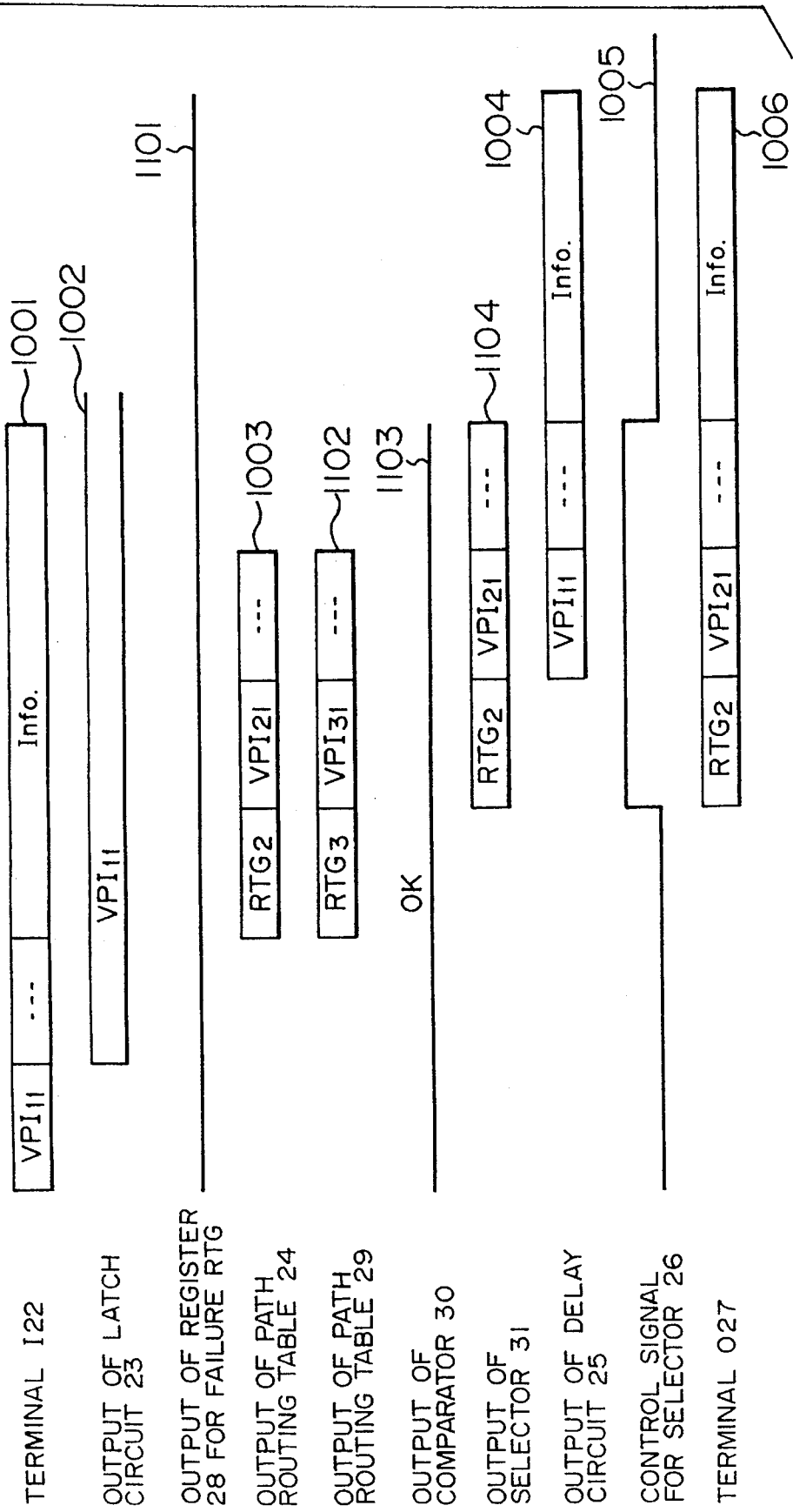
FIG. 2 is a time chart for explaining the operation of the FIG. 1 circuit (in the absence of any failure in a transmission line).

FIG. 1 shows a first circuit construction of a header converter used in the line controller of an ATM communication apparatus to realize a path changing method according to an embodiment of the present invention. FIG. 2 is a time chart for explaining the operation of the circuit shown in FIG. 1 (in the absence of any failure in a transmission line), and FIG. 3 is a time chart for explaining the operation of the circuit shown in FIG. 1 (in the presence of a failure in a transmission line).

The circuit shown in FIG. 1 adds to the circuit shown in FIG. 5 a register 28 for failure RTG for storing internal routing information of system corresponding to a failure transmission line when a failure occurs in the transmission line under the direction of the central processing unit 21 or a failure processor inside the line controller 5, 6 or 7, a comparator 30 for comparing the contents of the register 28 for failure RTG with internal routing information of system contained in output line routing information read out of routing tables 24 and 29, the second routing table 29 being adapted to store output line routing information of an alternating transmission line when a failure occurs in the transmission line, and a selector 31 for selecting the contents of the second routing table 29 in place of the contents of the first routing table 24 in the event of the occurrence of a failure in the transmission line.

Figure 3:
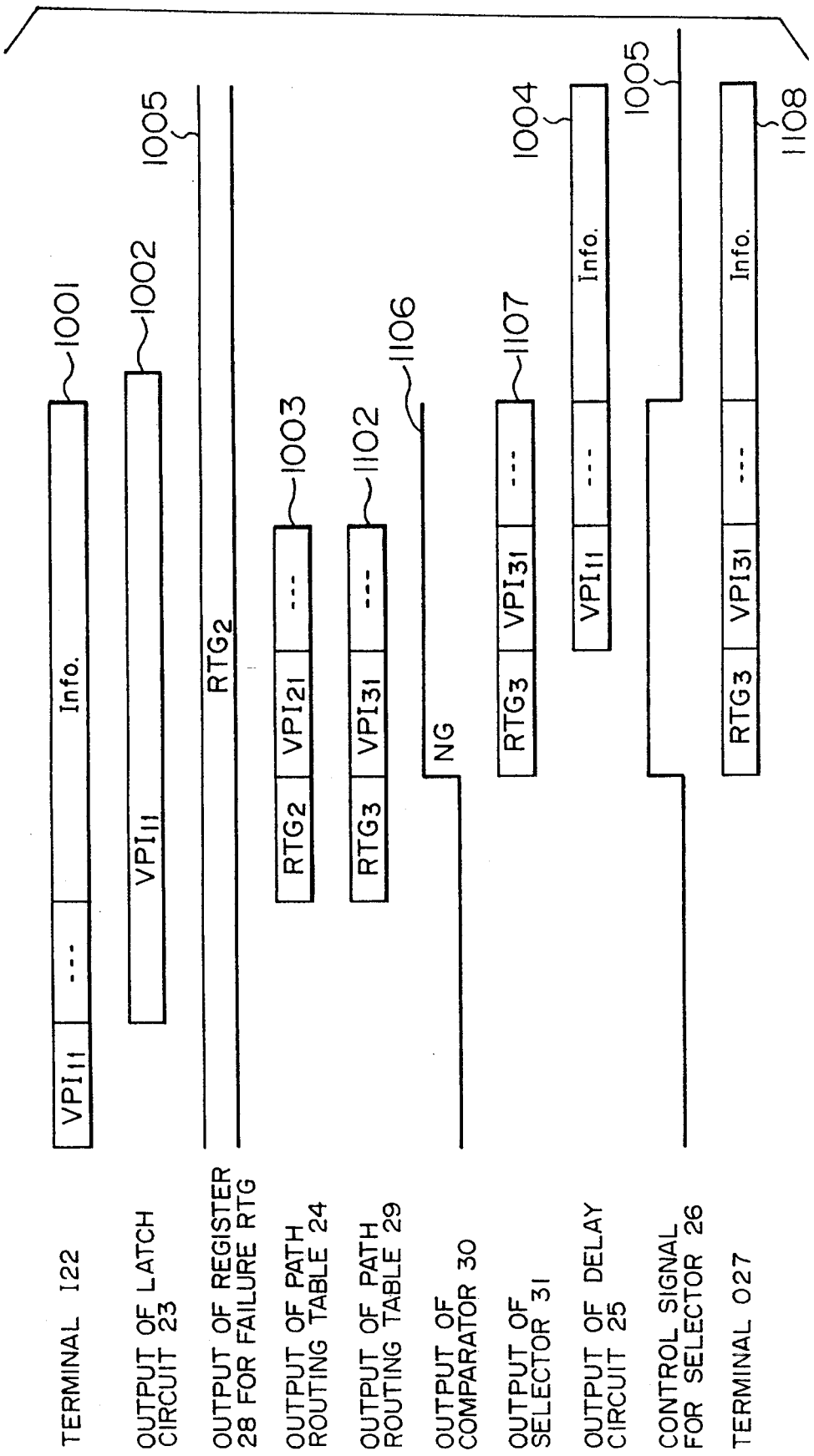
FIG. 3 is a time chart for explaining the operation of the FIG. 1 circuit (in the presence of a failure ill a transmission line).

An output of latch circuit 23 (1002 in FIG. 2 and 1002 in FIG. 3) is also connected to the second routing table 29 to read the contents of the first and second routing tables 24 and 29 simultaneously (1003 and 1102 in FIG. 2 and 1003 and 1102 in FIG. 3). Pieces of internal routing information of system in the contents read out of the first and second routing tables 24 and 29 are also applied to the comparator 30 so as to be compared thereby with internal routing information of system inputted from the register 28 for failure RTG.

The output of comparator 30 is connected to the selector 31 and functions to cause the selector 31 to select the contents of the first routing table 24 when two inputs to the comparator 30, that is, the output of register 28 and the output of the table 24 do not coincide with each other (1103 and 1104 in FIG. 2) but to cause the selector 31 to select the contents of the second routing table 29 when the two inputs to the comparator 30 coincide with each other (1106 and 1107 in FIG. 3). Accordingly, in the absence of any failure in an output line corresponding to an input ATM cell, the contents of the first routing table 24 is transmitted to the selector 26 (1104 in FIG. 2) but in the presence of a failure in the output line corresponding to the input ATM cell, the contents of the second routing table 29 is transmitted to the selector 26 (1107 in FIG. 3).

The selector 26 is operative to transmit the output of the selector 31 to the terminal 0 27 for a period during which the output routing information is added to the input ATM cell and transmit the output of the delay circuit 25 to the terminal 0 27 for the other period (1005 and 1006 in FIG. 2 and 1005 and 1108 in FIG. 3). The delay circuit 25 is adapted to delay the input ATM cell for a time beginning with the application of the ATM cell to the header converter and ending with the delivery of the adding output routing information from the selector 26.

Through the above operation, in the event of the occurrence of a failure in a transmission line, an ATM cell scheduled to be delivered to that transmission line is delivered to an alternating transmission line instead simultaneously with setting of the register 28 for failure RTG, thereby permitting high-speed changing of transmission line.

Figure 7:
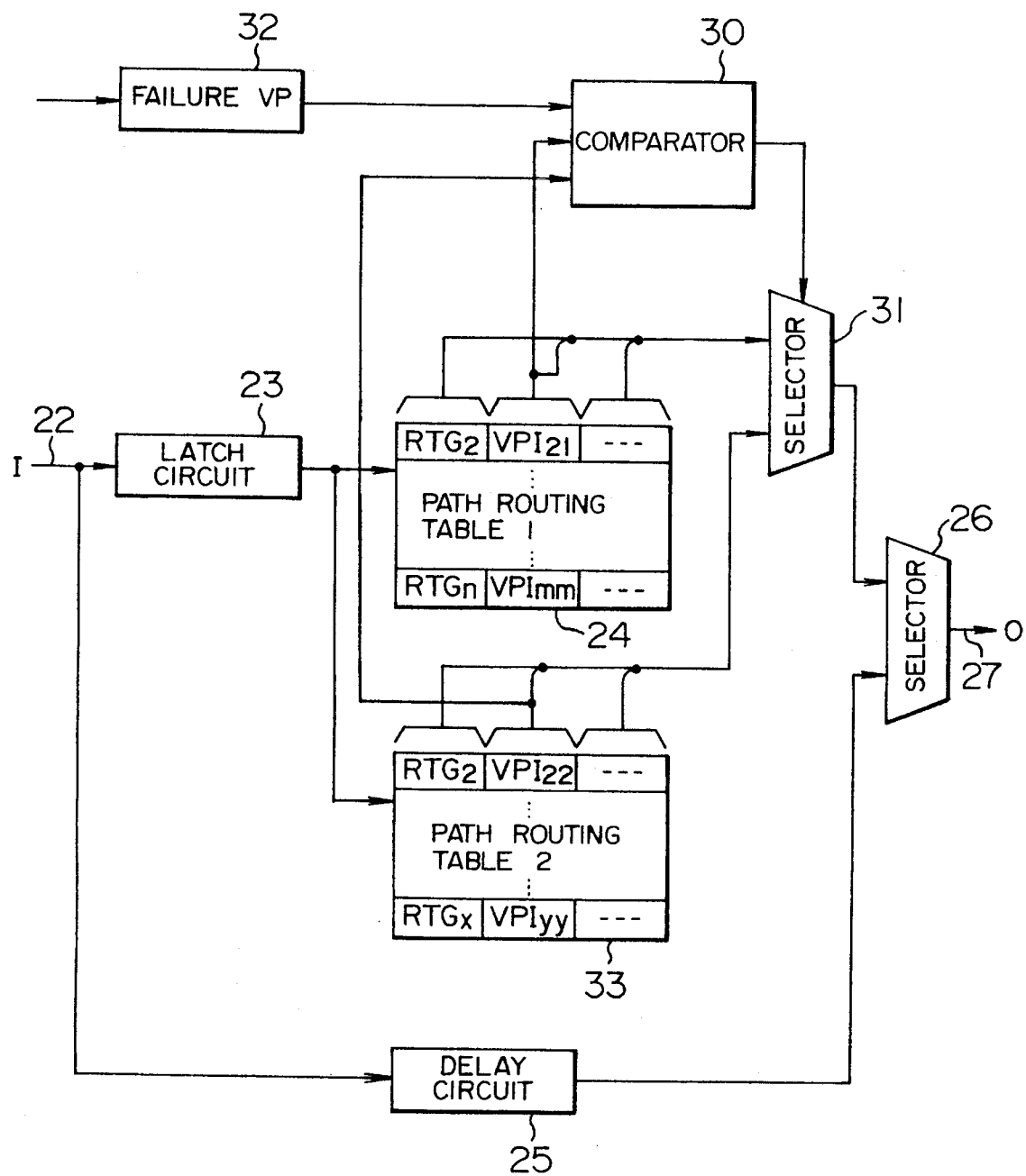
FIG. 7 is a block diagram showing the circuit construction of a second embodiment of the header converter in the line controller in the path changing system according to the present invention.
Figure 8:
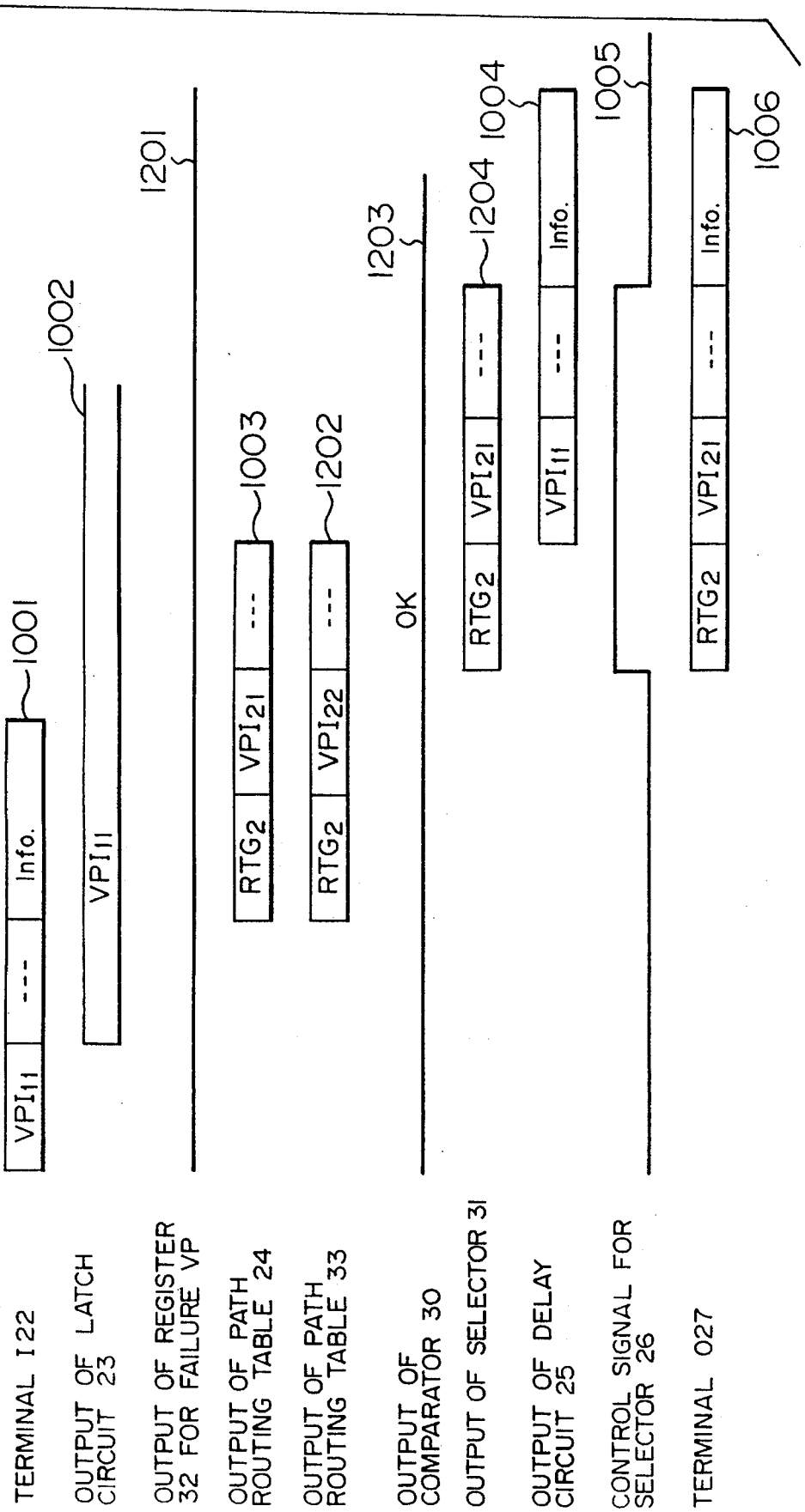
FIG. 8 is a time chart for explaining the operation of the FIG. 7 circuit (in the absence of any failure in a virtual path).

FIG. 7 shows a second circuit construction of the header converter inside the line controller for realization of the path changing method and system in the ATM communication apparatus according to the present invention. FIG. 8 is a time chart for explaining the operation of the circuit shown in FIG. 7 (in the absence of any failure in a virtual path) and FIG. 9 is a time chart for explaining the operation of the circuit shown in FIG. 7 (in the presence of a failure in a virtual path).

The circuit shown in FIG. 7 adds to the circuit shown in FIG. 5 a register 32 for failure VP for storing a VPI number corresponding to a virtual path suffering a failure when the failure occurs in that virtual path, a comparator 30 for comparing the contents of the register 32 for failure VP with a VPI number contained in output line routing information read out of routing tables 24 and 33, the second routing table 33 being adapted to store output line routing information of an alternating virtual path when a failure occurs in that virtual path, and a selector 31 for selecting the contents of the second routing table 33 in place of the contents of the first routing table 24 in the event of the occurrence of a failure in a transmission line.

Figure 9:
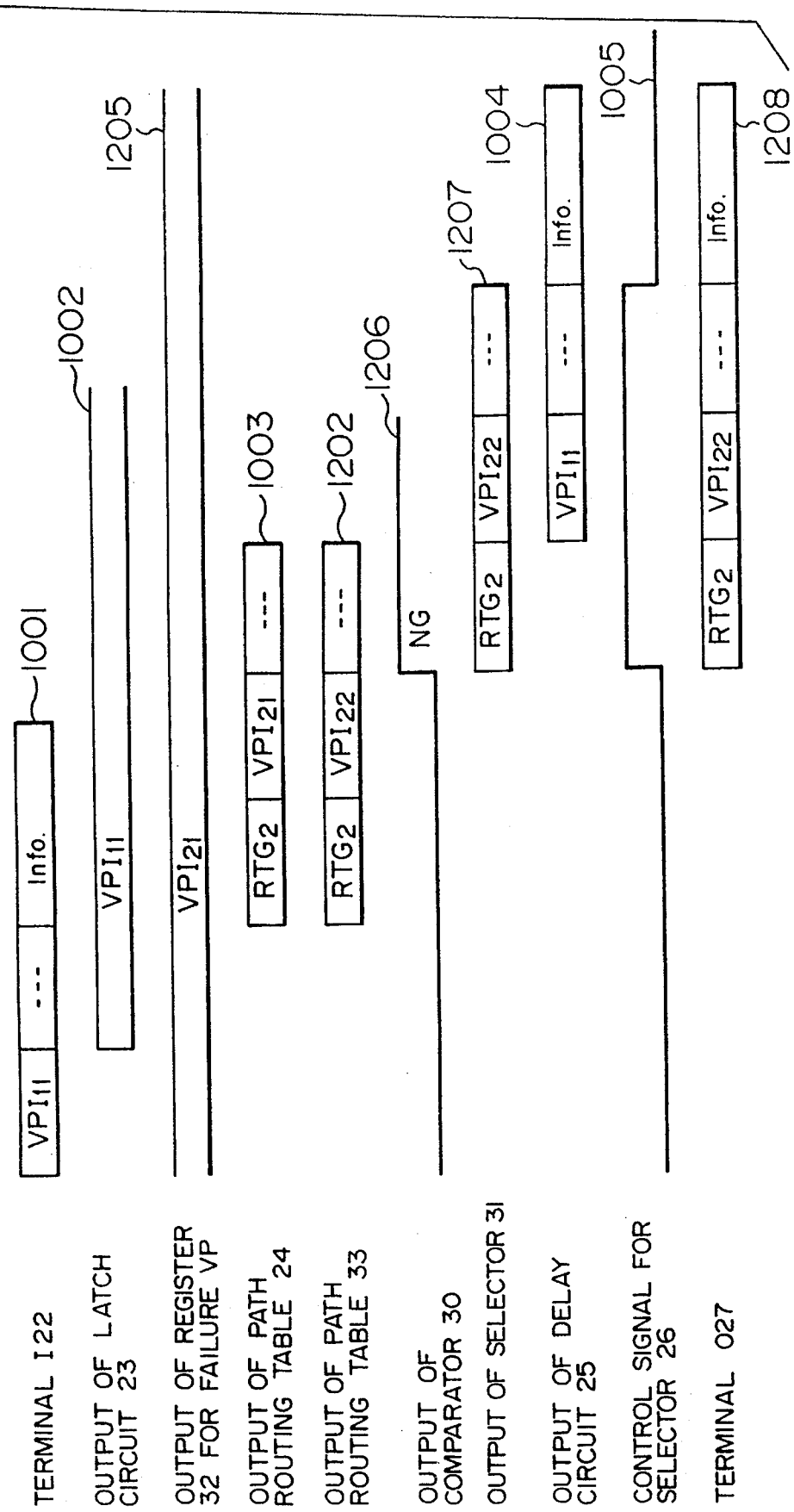
FIG. 9 is a time chart for explaining the operation of the FIG. 7 circuit (in the presence of a failure in a virtual path).

An output of latch circuit 23 (1002 in FIG. 8 and 1002 in FIG. 9) is also connected to the second routing table 33 to read the contents of first and second routing tables 24 and 33 simultaneously (1003 and 1202 in FIG. 8 and 1003 and 1202 in FIG. 9). VPI numbers in the contents read out of the first and second routing tables 24 and 33 are also applied to the comparator 30 so as to be compared thereby with the VPI number supplied from the register 32 for failure VP.

The output of comparator 30 is connected to the selector 31 and functions to cause the selector 31 to select the contents of the first routing table 24 when two inputs to the comparator 30, that is, the output of register 32 and the output of the table 24 do not coincide with each other (1203 and 1204 in FIG. 8) but to cause the selector 31 to select the contents of the second routing table 33 when the two inputs to the comparator 30 coincide with each other (1206 and 1207 in FIG. 9). Accordingly, in the absence of any failure in an output virtual path corresponding to the input ATM cell, the contents of the first path routing table 24 is transmitted to the selector 26 (1204 in FIG. 8) but in the presence of a failure in the output virtual path corresponding to the input ATM, the contents of the second routing table 33 is transmitted to the selector 26 (1207 in FIG. 9).

The selector 26 is operative to transmit the output of the selector 31 to the terminal 0 27 for a period during which the output routing information is added to the input ATM cell and transmits the output of the delay circuit 25 to the terminal 0 27 for the other period (1005 and 1006 in FIG. 8 and 1005 and 1208 in FIG. 9). The delay circuit 25 is adapted to delay the ATM cell for a time beginning with the application of the ATM cell to the header converter and ending with the delivery of the adding output routing information from the selector 26. In this manner, in the event of the occurrence of a failure in a virtual path, an ATM cell scheduled to be delivered to that virtual path is delivered to an alternating virtual path simultaneously with setting of the register 32 for failure VP, thereby permitting high-speed changing of path.

Figure 10:
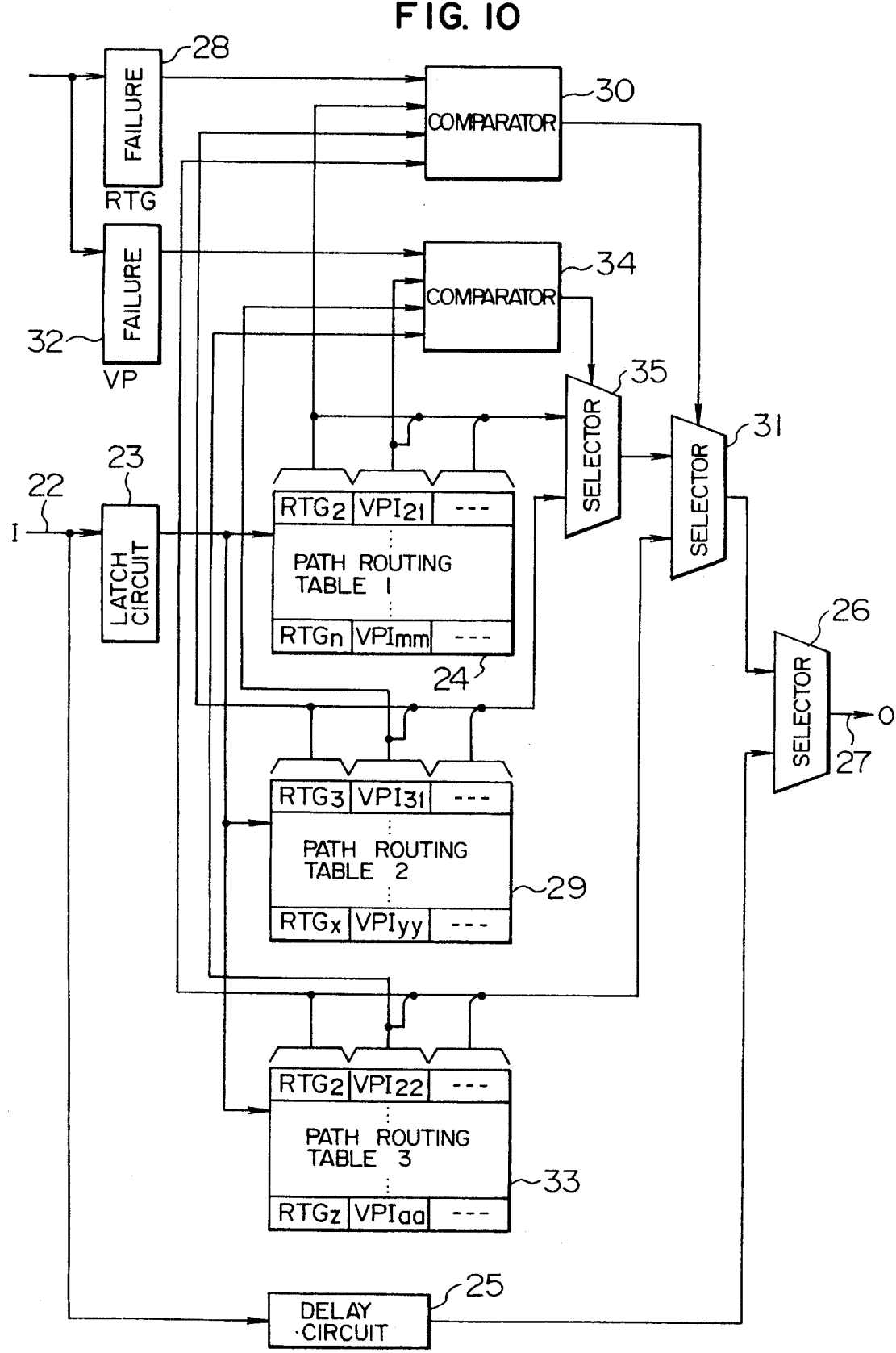
FIG. 10 is a block diagram showing the circuit construction of a third embodiment of the header converter in the line controller in the path changing system according to the present invention.

FIG. 10 shows a third circuit construction of header converter which adds to the FIG. 1 circuit a register 32 for failure VP, a comparator 34, a selector 35 and a third path routing table 33 and in this construction, VPI numbers contained in pieces of output line information read out of the routing tables 24, 29 and 33 are applied to the comparator 34. With this circuit construction, alternating in a unit of virtual path can be ensured in the event of a virtual path failure and alternating in a unit of transmission line can be ensured in the event of a transmission line failure as shown in the time charts of FIGS. 2, 3, 8 and 9.

Figure 11:
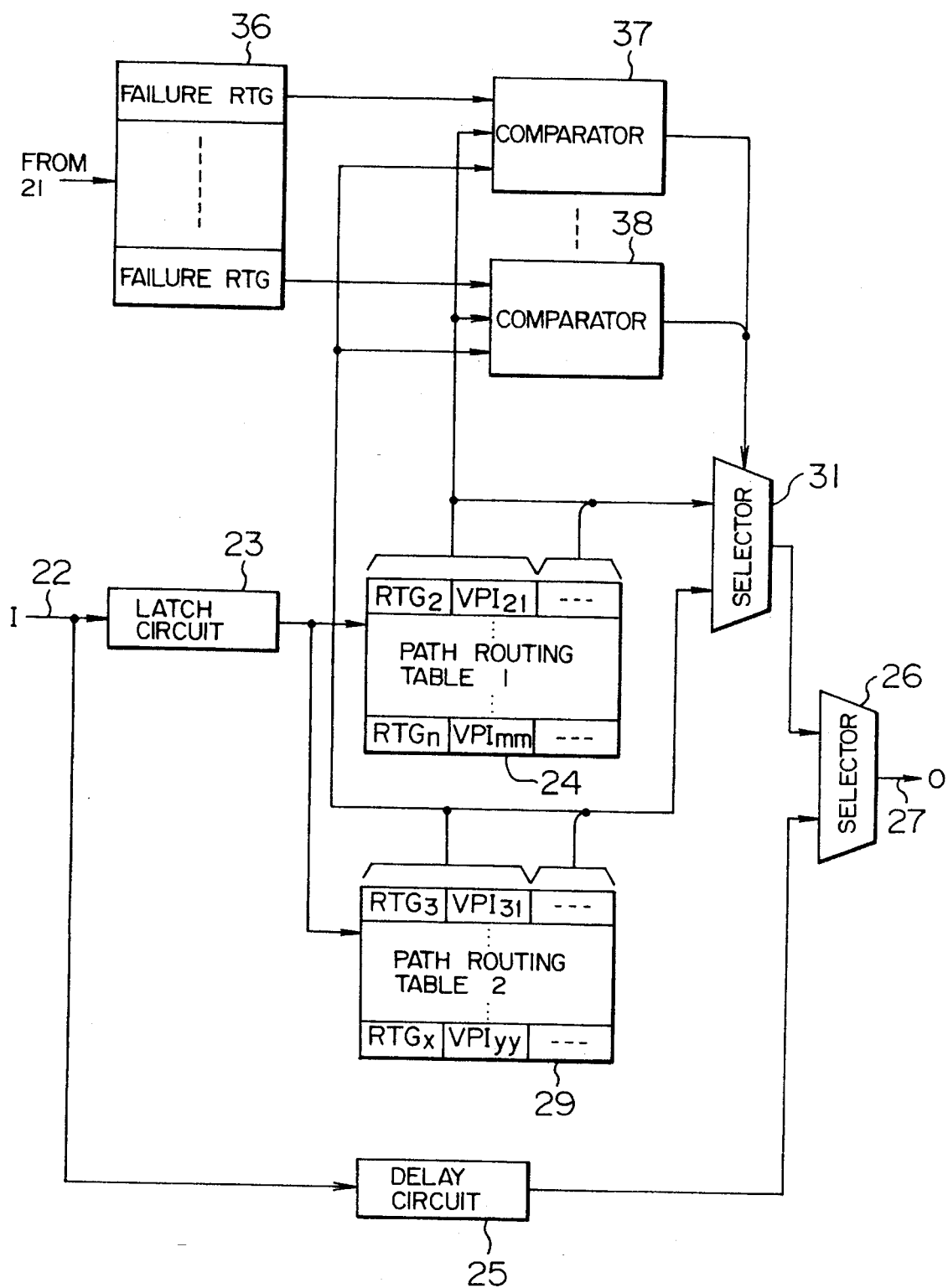
FIG. 11 is a block diagram showing the circuit construction of a fourth embodiment of the header converter of the line controller in the path changing system according to the present invention.

The FIG. 7 header converter circuit can be modified as shown in FIG. 11 to provide a fourth circuit construction of header converter wherein a register 36 for failure is provided which is constructed by assembling a plurality of registers for failure VP and registers for failure RTG to add to the register for failure VP the function of the register for failure RTG shown in FIG. 1, the thus constructed register is applied with an identification bit (identifier) used to determine which of virtual path and transmission line a failure belongs to, and comparators 37 and 38 respond to this bit to determine an object to be compared which is either internal routing information of system in output line routing information read out of the routing tables 24 and 29 or a VPI number read out of the routing tables 24 and 29. This construction permits alternating in a unit of virtual path in the event of a virtual path failure and alternating in a unit of transmission line in the event of a transmission line failure; and besides permits alternating even in the event that failures occur in a plurality of transmission lines or virtual paths.

FIG. 23 is a diagram showing the construction of the register 36 used in the FIG. 11 circuit construction. In the Figure, when the identification bit 230 has a value of "1", the value of data 231 shows a failure VP and when the identification bit has a value of "0", the value of data 231 shows a failure RTG.

Figure 12:
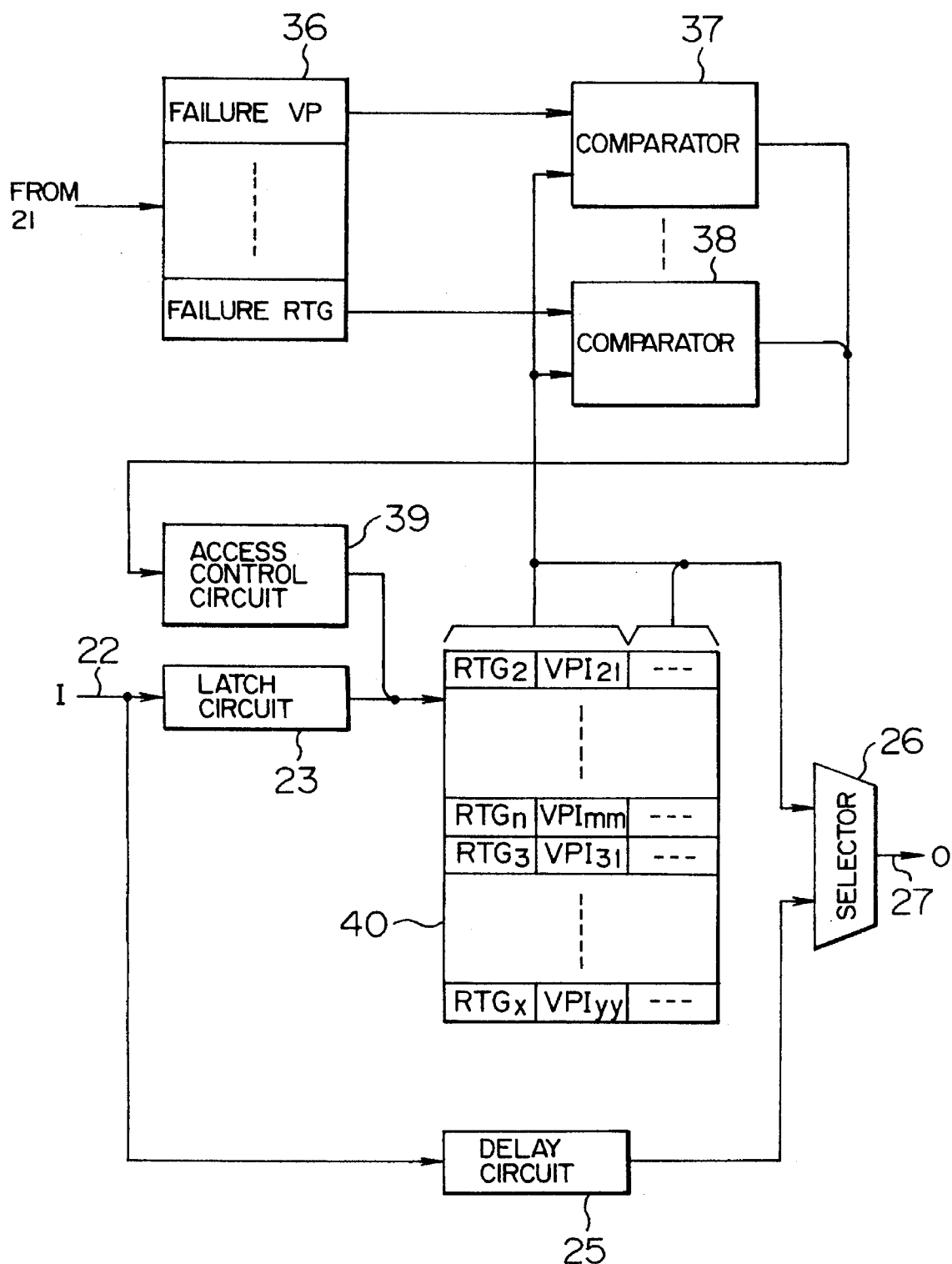
FIG. 12 is a block diagram showing the circuit construction of a fifth embodiment of the header converter in the line controller in the path changing system according to the present invention.
Figure 15:
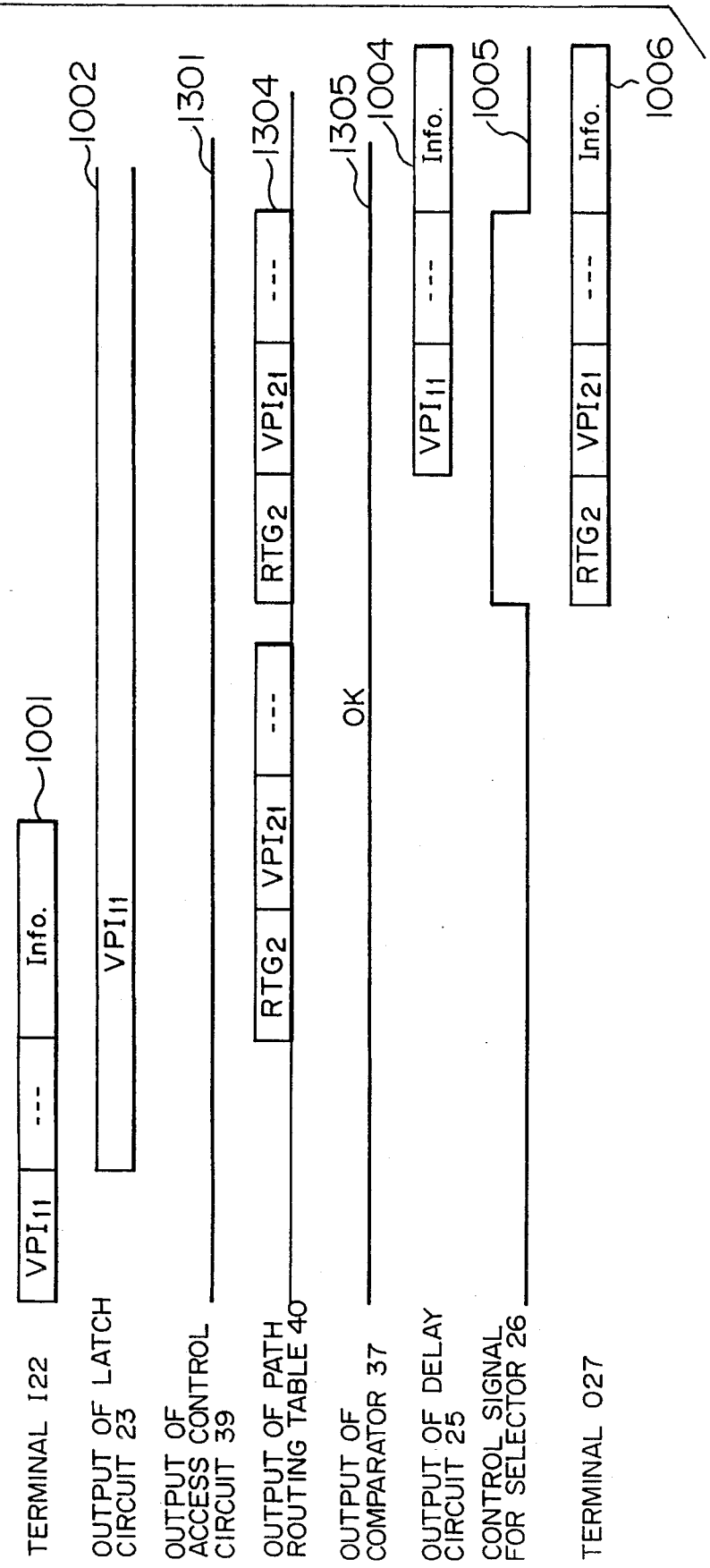
FIG. 15 is a time chart for explaining the operation of the FIG. 12 circuit (in the absence of any failure in a transmission line or a virtual path).

The FIG. 11 header converter circuit can be modified as shown in FIG. 12 to provide a fifth circuit construction of header converter wherein the first and second routing tables 24 and 29 are united into a routing table 40. FIGS. 13A and 13B show memory maps 41 and 42 of the routing tables 24 and 29 shown in FIG. 11, respectively, and FIG. 14 shows a memory map 43 of the routing table 40 shown in FIG. 12. FIG. 15 is a time chart in the absence of any failure occurring in a transmission line or a virtual path and FIG. 16 is a time chart in the presence of a failure occurring in a transmission line or a virtual path.

Figure 16:
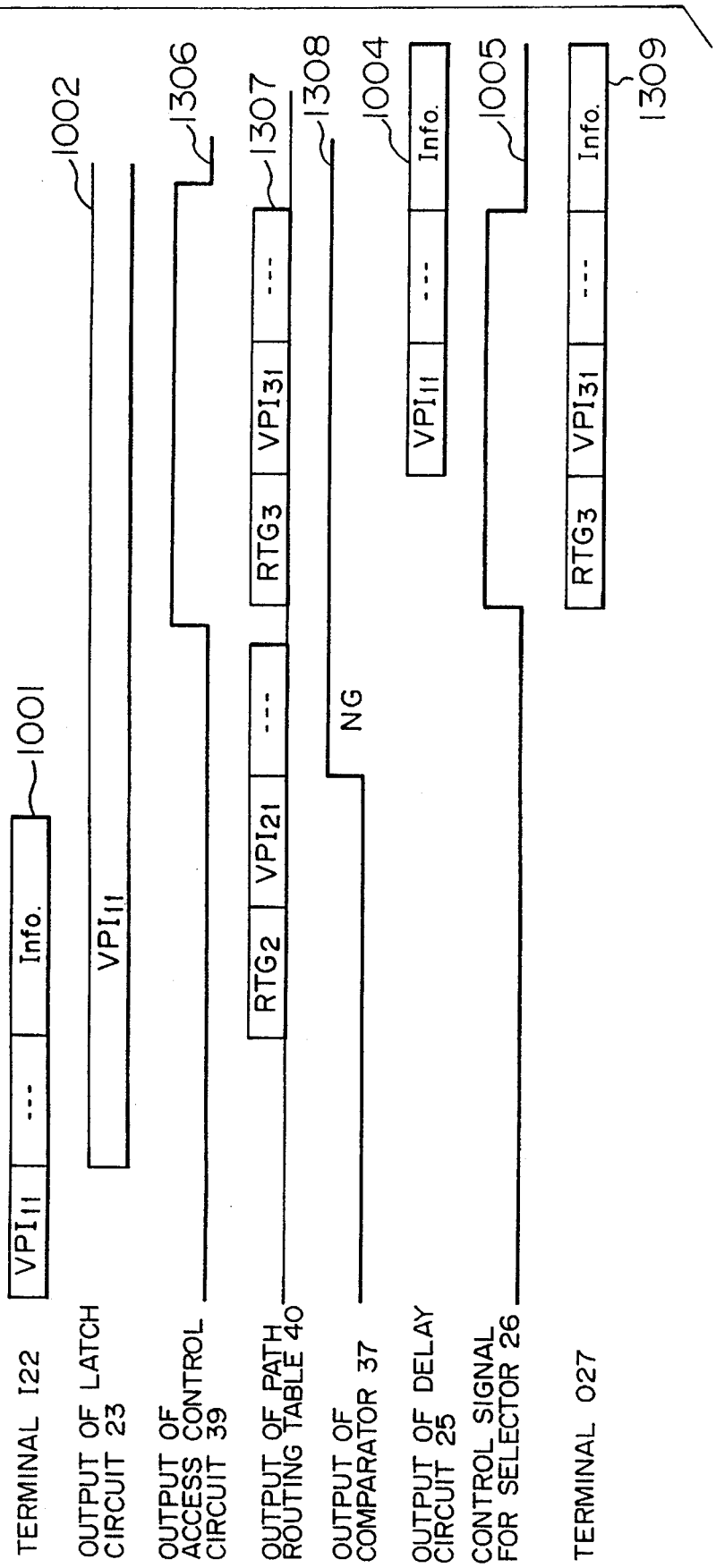
FIG. 16 is a time chart for explaining the operation of the FIG. 12 circuit (in the presence of a failure in a transmission line or a virtual path).

In FIG. 12, an access control circuit 39 for controlling reading of the routing table 40 controls the routing table 40 in such a manner that output line routing information corresponding to the first routing table 24 shown in FIG. 11 is read out during a first operation of reading the routing table 40 and during a second operation of reading the routing table 40, the output line routing information corresponding to the first routing table 24 is again read out when any inputs to the comparators 37 and 38 do not coincide with a failure VP or a failure RTG (1301 and 1304 in FIG. 15) but output line routing information corresponding to the second routing table 29 shown in FIG. 11 is read out when coincidence of any inputs to the comparators 37 and 38 with a failure VP or RTG occurs (1306 and 1307 in FIG. 16). This construction, like the circuit shown in FIG. 11, permits alternating in a unit of virtual path in the event of a virtual path failure or alternating in a unit of transmission line in the event of a transmission line failure and besides it permits alternating even when failures occur in a plurality of transmission lines or virtual paths. Further, the circuit construction shown in FIG. 12 can reduce the number of data lines of the routing table to ½ of that in the circuit shown in FIG. 11 and eliminate one selector, thus making it possible to provide a more economical circuit.

Referring to FIG. 18 and FIGS. 19A to 19F, an embodiment of the path changing method according to the present invention when a plurality of ATM communication apparatus constitute a network.

Figure 18:
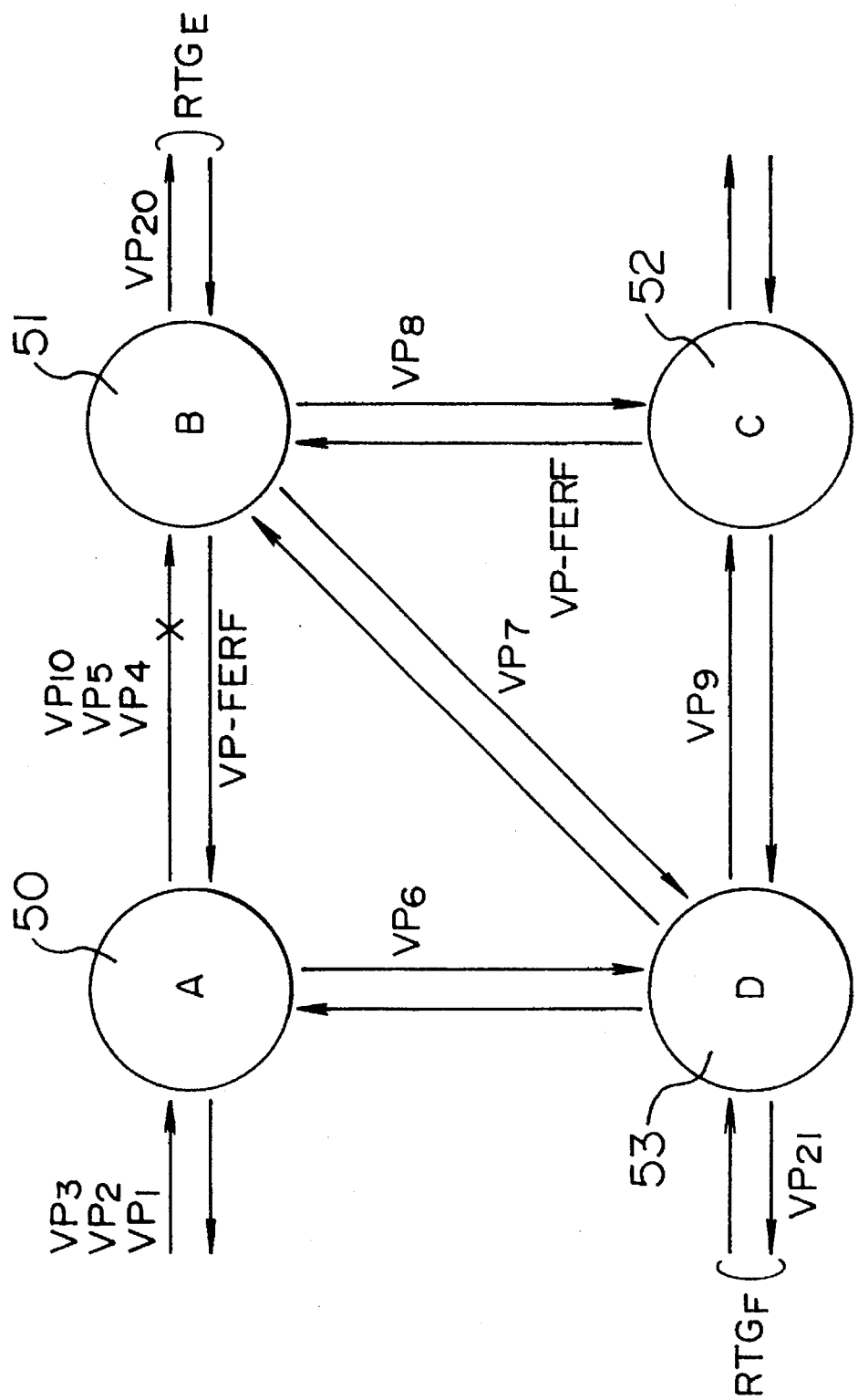
FIG. 18 is a diagram showing the construction of a network comprised of a plurality of ATM communication apparatus according to the present invention.

FIG. 18 is a diagram showing a network constructed of ATM communication apparatus A 50, B 51, C 52 and D 53. As to VP information used herein, an input VP is converted into an output VP inside each ATM communication apparatus. For example, a VP1 received by the ATM communication apparatus A 50 reaches the ATM communication apparatus C 52 through the ATM communication apparatus B 51 (converted from VP4 to VP 8), a VP2 received by the ATM communication apparatus A 50 is converted into a VP5 which in turn reaches the ATM communication apparatus B 51 and a VP3 received by the ATM communication apparatus A 50 is converted into a VP6 which in turn reaches the ATM communication apparatus D 53. In the network shown in FIG. 18, in the absence of a failure in any transmission lines or VP's, the first routing table is selected as the header converter table in all of the ATM communication apparatus A 50, B 51 and D 53 as shown in the memory maps of FIGS. 19A to 19F. At that time, in the event that a failure occurs in a transmission line between the ATM communication apparatus B 51 and C 52, the ATM communication apparatus C 52 transmits to the ATM communication apparatus B 51 a VP-FERF standing for failure information. When the central processing unit of the ATM communication apparatus B 51 receives the VP-FERF indicative of the failure transmission line, it sets internal routing information of system corresponding to that transmission line, that is, a failure RTG number (in this case, RTG=C) in the register for failure. As shown in the memory maps of FIGS. 19A to 19F, the second routing table is selected as the header converter table of the ATM communication apparatus B 51 when VP4 is received and RTG and VP assume D and 7, respectively, so that the VP1 received by the ATM communication apparatus A 50 reaches the ATM communication apparatus C 52 through the ATM communication apparatus B 51 and D 53 (converted from VP4 to VP7 and then to VP 9). In this manner, there is no need of rewriting the contents of the header converter table and consequently the path can be changed at a high speed. In the network shown in FIG. 18, in the event that a failure occurs in a path VP4 in the transmission line between the ATM communication apparatus A 50 and B 51, VP-FERF standing for failure information is transmitted from the ATM communication apparatus B 51 to the ATM communication apparatus A 50. When the central processing unit of the ATM communication apparatus A 50 receives the VP-FERF of the failure path, it sets internal routing information of system corresponding to that path, that is, a failure VP number (in this case VP=4) to the register for failure. As shown in the memory maps of FIGS. 19A to 19E, the second routing table is selected as the header converter table of the ATM communication apparatus A 50 when the VP1 is received and RTG remains to be B but VP assumes 10, so that the VP1 received by the ATM communication apparatus A 50 reaches the ATM communication apparatus C 52 through the ATM communication apparatus B 51 (converted from VP10 to VP8).

According to the present invention, in the event that a transmission line failure or a VP failure occurs, the transmission line or path changing processing is not carried out by the central processing unit but is effected in self-control fashion by the hardware installed in each line responding portion and hence changing can be completed in a short period of time even in a network and a system having no emergency transmission lines. In other words, a high-speed path changing system capable of reducing the path disconnection time can be realized and therefore highly reliable, highly economical and highly serviceable ATM communication network and ATM communication apparatus can be provided.

According to the present invention, even in the case where the transmission line is not duplex and in the case where a communication network is constructed in which a plurality of ATM communication apparatus are managed centrally by a network management center, hardware installed in each line responding portion performs the transmission line or path changing processing in self-control fashion without resort to much rewrite of the output path routing table of each ATM communication apparatus by means of the network management center and therefore the path changing can be completed instantaneously and the reliability of the whole of the network can be improved.

What is claimed is:

1. A communication apparatus wherein connecting information included in cells inputted from a plurality of digital lines are rewritten and internal routing information are added to the cells according to the connecting information to allow said cells to be output into the system, whereby the cells are multiplexed and switched to a plurality of predetermined output digital lines by converting at least one of an output connection and an output line, comprising:

a plurality of routing information storing apparatuses each for storing information of an output connection, an output line or both corresponding to one piece of input connecting information;

an equipment information registering apparatus for storing information indicative of states such as a failure, of said output line, an output communication apparatus, a communication apparatus of interest or communication equipment comprised of a combination thereof; and a selecting apparatus for selecting any one of said plurality of routing information storing apparatus based on correspondence between the contents of said equipment information registering apparatus and said plurality of routing information storing apparatus, whereby in the event of a failure occurring in said output line, the output communication apparatus, the communication apparatus of interest or a combination thereof, an output line, an output connection or an output apparatus is selected in self-control fashion from said plurality of routing information storing apparatuses in accordance with the failure.

2. A communication network comprised of a plurality of communication apparatuses wherein connecting information included in cells inputted from a plurality of digital lines are rewritten and internal routing information are added to the cells according to the connecting information to allow said cells to be output into the system, whereby the cells are multiplexed and switched to a plurality of predetermined output digital lines by converting at least one of an output connection and an output line, and including a managing apparatus for managing said plurality of communication apparatuses and a plurality of transmission lines, each communication apparatus including: a plurality of routing information storing apparatus each for storing information on an output connection, an output line or both in correspondence to an input cell; and an equipment information storing apparatus for storing states, such as a failure, of an output line, an output communication apparatus, a communication apparatus of interest or communication equipment comprised of a combination thereof, said managing apparatus being operative to set precedently a plurality of alternating output connections, output lines or both in said plurality of routing information storing apparatuses, correspondingly, to one piece of input connection information, in accordance with the states of the output communication apparatus, the communication apparatus of interest or the communication equipment, whereby an output line, an output connection or an output apparatus is selected in self-control fashion from said plurality of routing information storing apparatuses in accordance with the stored state of the output communication apparatus to be transmitted and received between communication apparatuses, the stored state of the communication apparatus of interest or the stored state of the communication equipment, so as to perform communication in said communication network by taking an alternating transmission line or an output connection.

3. An ATM communication apparatus wherein connecting information included in cells inputted from a plurality of digital lines are rewritten and internal routing information are added to the cells according to the connecting information to allow said cells to be output into the system, whereby the cells are multiplexed and switched to a plurality of predetermined output digital lines by converting at least one of a path identifier and a channel identifier, comprising:

a plurality of output path routing tables for storing an output path identifier, an output channel identifier and an output line corresponding to one input path identifier or channel identifier;

a failure information register for storing failure information indicative of a failure in an output line, output paths, output channel or a combination thereof;

a comparator for comparing the contents of said failure information register with the contents of said output path routing tables; and a selecting circuit responsive to an output of said comparator to select any one of said plurality of output path routing tables, whereby in the event of a failure in said output line, said output path, said output channel or a combination thereof, a normal output line, a normal output path, a normal output channel or a combination thereof is selected from said plurality of output path routing tables.

4. An ATM communication apparatus wherein connecting information included in cells inputted from a plurality of digital lines are rewritten and internal routing information are added to the cells according to the connecting information to allow said cells to be output into the system, whereby the cells are multiplexed and switched to a plurality of predetermined output digital lines by converting at least one of a path identifier and a channel identifier, comprising:

a plurality of output path routing tables for storing an output path identifier, an output channel identifier and an output line corresponding to one input path identifier or channel identifier;

a failure information register for storing failure information indicative of a failure in at least one of an output line, output path, and output channel;

a comparator for comparing the contents of said failure information register with the contents of said output path routing tables; and a selecting circuit responsive to an output of said comparator to select any one of said plurality of output path routing tables, whereby in the event of a failure occurring in said at least one of said output line, said output path, and said output channel, at least one of a normal output line, a normal output path and a normal output channel is selected from said plurality of output path routing tables.

5. An ATM communication apparatus wherein connecting information included in cells inputted from a plurality of digital lines are rewritten and internal routing information are added to the cells according to the connecting information to allow said cells to be output into the system, whereby the cells are multiplexed and switched to a plurality of predetermined output digital lines by converting at least one of a path identifier and a channel identifier, comprising:

a plurality of output path routing tables for storing an output path identifier, an output channel identifier and an output line corresponding to one input path identifier or channel identifier;

a failure information register for storing failure information indicative of a failure in an output line, an output path, an output channel or a combination thereof;

a comparator for comparing the contents of said failure information register with the contents of said output path routing tables; and a selecting circuit responsive to an output of said comparator to select any one of said plurality of output path routing tables, whereby in the event of a failure occurring in said output line, said output channel, said output channel or said combination thereof, a normal output line, a normal output path, a normal output channel or a combination thereof is selected from said plurality of output path routing tables.

6. An ATM communication apparatus wherein connecting information included in cells inputted from a plurality of digital lines are rewritten and internal routing information are added to the cells according to the connecting information to allow said cells to be output into the system, whereby the cells are multiplexed and switched to a plurality of predetermined output digital lines by converting at least one of a path identifier and a channel identifier, comprising:

a plurality of output path routing tables for memorizing an output path identifier, an output channel identifier and an output line corresponding to one input path identifier;

a first failure information register for storing failure information indicative of a failure in said output line;

a second failure information register for storing failure information indicative of a failure in said output path;

a third failure information register for storing failure information indicative of a failure in said output channel;

a first comparator for comparing the contents of said first failure information register with the contents of said output path routing tables;

a second comparator for comparing the contents of said second failure information register with the contents of said output path routing tables;

a third comparator for comparing the contents of said third failure information register with the contents of said output path routing tables; and selecting circuits responsive to outputs of said first, second and third comparators to select any one of said plurality of output path routing tables, whereby in the event of a failure occurring in said output line, said output path, said output channel or a combination thereof, a normal output line, a normal output path, a normal output channel or a combination thereof is selected from said plurality of output path routing tables.

7. An ATM communication apparatus wherein connecting information included in cells inputted from a plurality of digital lines are rewritten and internal routing information are added to the cells according to the connecting information to allow said cells to be output into the system, whereby the cells are multiplexed and switched to a plurality of predetermined output digital lines which include a plurality of output paths, and a plurality of output channels, comprising:

a plurality of output path routing tables for storing an output path identifier, an output channel identifier and an output line corresponding to one input path identifier or channel identifier;

a failure information register for storing failure information indicative of a failure in said output line, output path, output channel or a combination thereof;

an identifier for indicating which of said output line, said output path, said output channel and a combination thereof the output failure belongs to;

a comparator for comparing the contents of said failure information register and said identifier with the contents of said output path routing tables; and a selecting circuit responsive to an output of said comparator to select any one of said plurality of output path routing tables, whereby in the event of a failure occurring in said output line, said output path, said output channel or a combination thereof, a normal output line, a normal output path, a normal output channel or a combination thereof is selected from said plurality of output path routing tables.

8. The ATM communication apparatus according to claim 7 further including a plurality of failure information registers and identifiers and in the event of failures occurring in any one of the plurality of output lines, the plurality of output paths, and the plurality of output channels, the system selecting normal output lines, output paths, output channels or a combination thereof from said plurality of output path routing tables to take alternating lines, paths or channels.

9. The ATM communication apparatus according to claim 7 wherein said output path routing tables include a single output path routing table for storing a plurality of output path identifiers, output channel identifiers and output lines corresponding to one input path identifier or channel identifier and, the system further including an access controller apparatus for controlling a sequence of reading said plurality of pieces of information stored in said single output path routing table, whereby said single output path routing table is read a plurality of times so that in the event of failures occurring in the plurality of output lines, output paths, output channels or a combination thereof, the access controller selects normal output lines, output paths, output channels or a combination thereof from said single output path routing table to take alternating lines, paths, or channels.

10. A communication path changing method for an ATM communication network comprised of a plurality of ATM communication apparatus, a managing apparatus for managing said plurality of ATM communication apparatus and transmission lines, each of said plurality of ATM communication apparatus being adapted to realize the function to multiplex and switch a plurality of digital lines by converting a path identifier, a channel identifier or both and adding internal routing information of system to an ATM cell and having a changing system including a plurality of output path routing tables for storing an output path identifier, an output channel identifier and an output line corresponding to one input path identifier or channel identifier, a failure information register for storing failure information indicative of a failure in said output line, a comparator for comparing the contents of said failure information register with the contents of said output path routing tables, and a selecting circuit responsive to an output of said comparator to select any one of said plurality of output path routing tables, so that in the event of a failure occurring in said output line, a normal output line is selected from said plurality of output path routing tables, precedently setting a plurality of alternating output path identifiers, output channel identifiers and output lines taken in an event of a failure occurring in an output line, an output path, an output channel or a combination thereof in said plurality of output path routing tables provided in each ATM communication apparatus by means of said managing apparatus, and each ATM communication apparatus inter-station failure information transmitted and received between communication apparatus and said path changing system of said ATM communication apparatus of interest to select a normal output line, a normal output path, a normal output channel or a combination thereof from said routing tables and performing communication in said ATM communication network by taking an alternating line, path or channel.

11. A communication path changing method for an ATM communication network comprised of a plurality of ATM communication apparatus, a managing apparatus for managing said plurality of ATM communication apparatus and transmission lines, each of said plurality of ATM communication apparatus being adapted to realize the function to multiplex and switch a plurality of digital lines by converting a path identifier, a channel identifier or both and adding internal routing information of system to an ATM cell and having a changing system including a plurality of output path routing tables for storing an output path identifier, an output channel identifier and an output line corresponding to one input path identifier or channel identifier, a failure information register for storing failure information indicative of a failure in said output path, a comparator for comparing the contents of said failure information register with the contents of said output path routing tables, and a selecting circuit responsive to an output of said comparator to select any one of said plurality of output path routing tables, so that in the event of a failure occurring in said output path, a normal output path is selected from said plurality of output path routing tables, comprising:

precedently setting a plurality of alternating output path identifiers, output channel identifiers and output lines taken in an event of a failure occurring in an output line, an output path, an output channel or a combination thereof in said plurality of output path routing tables provided in each ATM communication apparatus by means of said managing apparatus, and each ATM communication apparatus using inter-station failure information transmitted and received between communication apparatus and said path changing system of said ATM communication apparatus of interest selecting a normal output line, a normal output path, a normal output channel or a combination thereof from said routing tables and performing communication in said ATM communication network by taking an alternating line, path or channel.

12. A communication path changing method for an ATM communication network comprised of a plurality of ATM communication apparatus, a managing apparatus for managing said plurality of ATM communication apparatus and transmission lines, each of said plurality of ATM communication apparatus being adapted to realize the function to multiplex and switch a plurality of digital lines by converting a path identifier, a channel identifier or both and adding internal routing information of system to an ATM cell and having a changing system including a plurality of output path routing tables for storing an output path identifier, an output channel identifier and an output line corresponding to one input path identifier or channel identifier, a failure information register for storing failure information indicative of a failure in said output channel, a comparator for comparing the contents of said failure information register with the contents of said output path routing tables, and a selecting circuit responsive to an output of said comparator to select any one of said plurality of output path routing tables, so that in the event of a failure occurring in said output channel, a normal output channel is selected from said plurality of output path routing tables, comprising:

precedently setting a plurality of alternating output path identifiers, output channel identifiers and output lines taken in the event of a failure occurring in an output line, an output path, an output channel or a combination thereof in said plurality of output path routing tables provided in each ATM communication apparatus by means of said managing apparatus, and each ATM communication apparatus inter-station failure information transmitted and received between communication apparatus and said path changing system of said ATM communication apparatus of interest a normal output line, a normal output path, a normal output channel or a combination thereof from said routing tables and performing communication in said ATM communication network by taking an alternating line, path or channel.

13. A communication path changing method for an ATM communication network comprised of a plurality of ATM communication apparatus, a managing apparatus for managing said plurality of ATM communication apparatus and transmission lines, each of said plurality of ATM communication apparatus being adapted to realize the function to multiplex and switch a plurality of digital lines by converting a path identifier, a channel identifier or both and adding internal routing information of system to an ATM cell and having a changing system including a plurality of output path routing tables for storing an output path identifier, an output channel identifier and an output line corresponding to one input path identifier or channel identifier, a first failure information register for storing failure information indicative of a failure in said output line, a second failure information register for storing failure information indicative of a failure in said output path, a third failure information register for storing failure information indicative of a failure in said output channel, a first comparator for comparing the contents of said first failure information register with the contents of said output path routing tables, a second comparator for comparing the contents of said second failure information register with the contents of said output path routing tables, a third comparator for comparing the contents of said third failure information register with the contents of said output path routing tables, and selecting circuits responsive to outputs of said first, second and third comparators to select any one of said plurality of output path routing tables, so that in the event of a failure occurring in said output line, said output path, said output channel or a combination thereof, a normal output line, a normal output path, a normal output channel or a combination thereof is selected from said plurality of output path routing tables, comprising:

setting a plurality of alternating output path identifiers and output channel identifiers and output lines taken in an event of failure occurring in an output line, an output path, an output channel or a combination thereof in said plurality of output path routing tables provided in each ATM communication apparatus by means of said managing apparatus, and each ATM communication apparatus using inter-station failure information transmitted and received between communication apparatus and said path changing system of said ATM communication apparatus of interest selecting a normal output line, a normal output path, a normal output channel or a combination thereof from said routing tables and performing communication in said ATM communication network by taking an alternating line, path or channel.

14. A communication path changing method for an ATM communication network comprised of a plurality of ATM communication apparatus, a managing apparatus for managing said plurality of ATM communication apparatus and transmission lines, each of said plurality of ATM communication apparatus being adapted to realize the function to multiplex and switch a plurality of digital lines by converting a path identifier, a channel identifier or both and adding internal routing information of system to an ATM cell and having a changing system including a plurality of output path routing tables for storing an output path identifier, an output channel identifier and an output line corresponding to one path identifier or channel identifier, a failure information register for storing failure information indicative of a failure in said output line, output path, output channel or a combination thereof, an identifier for indicating which of said output line, said output path, said output channel and a combination thereof the output failure belongs to, a comparator for comparing the contents of said failure information register and said identifier with the contents of said output path routing tables, and a selecting circuit responsive to an output of said comparator to select any one of said plurality of output path routing tables, so that in the event of a failure occurring in said output line, said output path, said output channel or a combination thereof, a normal output line, a normal output path, a normal output channel or a combination thereof is selected from said plurality of output path routing tables, comprising:

setting a plurality of alternating output path identifiers, output channel identifiers and output lines taken in an event of a failure occurring in an output line, an output path, an output channel or a combination thereof in said plurality of output path routing tables provided in each ATM communication apparatus by means of said managing apparatus, and each ATM communication apparatus using inter-station failure information transmitted and received between communication apparatus and said path changing system of said ATM communication apparatus of interest selecting a normal output line, a normal output path, a normal output channel or a combination thereof from said routing tables and performing communication in said ATM communication network by taking an alternating line, path or channel.

15. A communication path changing method according to claim 14 wherein a plurality of failure information registers and identifiers are provided and in the event of failures occurring in a plurality of output lines, selecting a plurality of output paths, a plurality of output channels or a combination thereof from said plurality of output path routing tables to take alternating lines, paths or channels.

16. A communication path changing method according to claim 14 wherein said output path routing tables include a single output path routing table for storing a plurality of output path identifiers, output channel identifiers and output lines corresponding to one input path identifier or channel identifier and an access controller apparatus for controlling the sequence of reading said plurality of pieces of information stored in said single table, the method further including reading said single output path routing table a plurality of times, and in the event of failures occurring in a plurality of output lines, output paths, output channels or a combination thereof, selecting normal output lines, output paths, output channels or a combination thereof from said single output path routing table to take alternating lines, paths, or channels.

17. A path changing system for use in a cell switching system wherein connecting information included in cells input from a plurality of digital lines are rewritten and internal routing information are added to the cells according to the connecting information to allow said cells to be output into the system, whereby the cells are multiplexed and switched to a plurality of predetermined output digital lines, comprising:

(1) a first memory connected to at least one of input digital lines for storing (A) internal routing information indicative of output digital lines and (B) connecting information on output cells, in association with connecting information included in input cells;

(2) a second memory connected to at least one of the input digital lines for storing (A) internal routing information indicative of output digital lines different from the output digital lines indicated by the information stored in said first memory and (B) connecting information on output cells, in association with the connecting information included in the input cells;

(3) a third memory connected to at least one of the input digital lines for storing, when one of the output digital lines is faulty, internal routing information indicative of the faulty output digital line;

(4) a comparator connected to at least one of the input digital lines for comparing internal routing information read out from said first and second memories with internal routing information read out from said third memory;

(5) a first selector connected to at least one of the input digital lines for outputting either of connecting information and internal routing information read out from said first memory and connecting information and internal routing information read out from said second memory; and, (6) a second selector connected to at least one of the input digital lines for outputting an output from said first selector only when connecting information of the input cells are to be rewritten and only when internal routing information are to be added and for outputting the input cells, wherein (A) internal routing information indicative of output digital lines and (B) connecting information on an output cell are read out according to connecting information included in a cell input from an input digital line from said first and second memories so that, when one of the output digital lines indicated by the read out internal routing information is faulty, causing an associated comparator to produce a match signal, a first selector is controlled to cause contents of the memory storing the internal routing information to which no match signal is produced in said comparator to be output to a second selector, whereby the cell having the connecting information rewritten and having internal routing information added thereto to indicate a normal output digital line is output into the system from said second selector to allow said cell to be output therefrom to the normal output digital line.

18. A path changing system for use in a cell switching system wherein connecting information included in cells input from a plurality of digital lines are rewritten and internal routing information are added to the cells according to the connecting information to allow said cells to be output into the system, whereby the cells are multiplexed and switched so as to be output to a plurality of predetermined output digital lines, comprising:

(1) a first memory connected to at least one of input digital lines for storing (A) connecting information indicative of output paths and (B) internal routing information, in association with connecting information included in input cells;

(2) a second memory connected to at least one of the input digital lines for storing (A) connecting information indicative of output paths different from the output paths indicated by the information stored in said first memory and (B) internal routing information, in association with the connecting information included in the input cells;

(3) a third memory connected to at least one of the input digital lines for storing, when one of the output paths is faulty, connecting information indicative of the faulty output path;

(4) a comparator connected to at least one of the input digital lines for comparing the connecting information read out from said first and second memories with the connecting information read out from said third memory;

(5) a first selector connected to at least one of the input digital lines for outputting either of (A) connecting information and internal routing information read out from said first memory and (B) connecting information and internal routing information read out from said second memory; and, (6) a second selector connected to at least one of the input digital lines for outputting outputs from said first selector only when connecting information of the input cells are to be rewritten and only when internal routing information is to be added and for outputting the input cells as they are at the other timings, wherein (A) connecting information indicative of output paths and (B) internal routing information are read out according to connecting information included in a cell input from an input digital line from first and second memories so that, when one of the output paths indicated by the read-out connecting information is faulty, causing an associated comparator to produce a match signal, a first selector is controlled to cause contents of the memory storing the connecting information to which no match signal is produced in said comparator to be output to said second selector, whereby the cell having the connecting information rewritten to indicate a normal output connection and having internal routing information added thereto is output into the system from said second selector to allow said cell to be output therefrom to the normal output path.

19. A path changing system for use in a cell switching system wherein connecting information included in cells input from a plurality of digital lines are rewritten and internal routing information are added to the cells according to the connecting information to allow said cells to be output into the system, whereby the cells are multiplexed and switched so as to be output to a plurality of predetermined output digital lines, comprising:

(1) a first memory connected to at least one of the input digital lines for storing (A) connecting information indicative of output paths and (B) internal routing information indicative of output digital lines, in association with connecting information included in input cells;

(2) a second memory connected to at least one of the input digital lines for storing (A) connecting information indicative of output paths different from the output paths indicated by the information stored in said first memory and (B) internal routing information indicative of output digital lines different from the output digital lines indicated by the information stored in said first memories, in association with the connecting information included in the input cells;

(3) a third memory means connected to at least one of the input digital lines for storing (A) connecting information indicative of output paths different from the output paths indicated by the information stored in said first and second memories and (B) internal routing information indicative of output digital lines different from the output digital lines indicated by the information stored in said first and second memories, in association with the connecting information included in the input cells;

(4) a fourth memory connected to at least one of the input digital lines for storing, when one of the output paths is faulty, internal routing information indicative of the faulty output path;

(5) a fifth memory connected to at least one of the input digital lines for storing connecting information indicative of one of the output connections which is faulty;

(6) a first comparator connected to at least one of the input digital lines for comparing connecting information read out from said first, second and third memories with connecting information read out from said fifth memory means;

(7) a second comparator connected to at least one of the input digital lines for comparing internal routing information read out from said first, second and third memories with internal routing information read out from said fourth memory;

(8) a first selector connected to at least one of the input digital lines, for outputting either of connecting information and internal routing information read out of said first memory and connecting information and internal routing information read out from said second memory;

(9) a second selector connected to at least one of the input digital lines, for outputting either of (A) an output of said first selector and (B) connecting information and internal routing information read out from said third memory; and,

(10) a third selector connected to at least one of the input digital lines, for outputting outputs from said second selector only when connecting information of the input cells are to be rewritten and when the internal routing information is to be added and for outputting the input cells, wherein (A) connecting information indicative of output paths and (B) internal routing information are read out according to connecting information included in a cell input from an input digital line from said first and second memories so that, said first comparator producing a match signal when one of the output paths indicated by the read out connecting information is faulty, a first selector is controlled to cause contents of the memory storing the connecting information to which no match signal is produced in a first comparator to be output to said second selector, and when both of an output digital line indicated by the internal routing information read out from a third memory and an output digital line indicated by the internal routing information stored in the memory storing connecting information to which no match signal is produced in said first comparator are faulty, causing the second comparator to produce a match signal, said second selector causing contents of the memory storing the connecting information to which no match signal is produced in said second comparator to be output to said third selector, whereby the cell having the connecting information rewritten to indicate a normal output path and having internal routing information added thereto is outputted into the system from said second selector to the normal output path.

20. A path changing system for use in a cell switching system wherein connecting information included in cells inputted from a plurality of digital lines are rewritten and internal routing information are added to the cells according to the connecting information to allow said cells to be output into the system, whereby the cells are multiplexed and switched to a plurality of predetermined output digital lines, comprising:

(1) a first memory connected to at least one of input digital lines for storing (A) connecting information indicative of output paths and (B) internal routing information indicative of output digital lines, in association with the connecting information included in input cells;

(2) a second memory connected to at least one of the input digital lines for storing (A) connecting information indicative of output paths different from the output paths indicated by the information stored in said first memory and (B) internal routing information indicative of output digital lines different from those indicated by the information stored in said first memory, in association with the connecting information included in the input cells;

(3) a third memory connected to at least one of the input digital lines for storing when a fault occurs in one of the output digital lines, (A) internal routing information indicative of the faulty output digital line and (B) information indicative of said fault in the output digital lines and also storing, when a fault occurs in one of the output paths, connecting information indicative of said fault in the output paths;

(4) a comparator connected to at least one of the input digital lines for comparing, when the information stored in said third memory indicates an output digital line fault, internal routing information read out from said first and second memories with internal routing information read out from said third memory and for comparing, when the information stored in said third memory means indicates an output path fault, connecting information read out from said first and second memories with connecting information read out from said third memory;

(5) a first selector connected to at least one of the input digital lines for outputting either of connecting information and internal routing information read out from said first memory and connecting information and internal routing information read out from said second memory; and, (6) a second selector connected to at least one of the input digital lines for outputting outputs from said first selector only when connecting information of the input cells are to be rewritten and only when internal routing information are to be added and for outputting the input cells as they are at the other timings, wherein (A) connecting information indicative of output digital lines and output paths and (B) internal routing information are read out according to connecting information included in a cell input from an input digital line from said first and second memories so that, when one of the output digital lines indicated by the read out internal routing information is faulty or when one of the output paths indicated by the read out connecting information is faulty, causing a comparator to produce a match signal, a first selector is controlled to cause contents of the memory storing internal routing information or connecting information to which no match signal is produced in said comparator to be outputted to said second selector, whereby the cell having connecting information rewritten to indicate a normal output digital line and output path and having internal routing information added thereto, is outputted into the system and thus is outputted therefrom to the normal output digital line or normal output path.

21. A path changing system for use in a cell switching system wherein connecting information included in cells input from a plurality of digital lines are rewritten and internal routing information are added to the cells according to the connecting information to allow said cells to be output into the system, whereby the cells are multiplexed and switched so as to be output to a plurality of predetermined output digital lines, comprising:

(1) a first memory connected to at least one of input digital lines for storing (A) connecting information indicative of output paths and (B) internal routing information indicative of output digital lines, in association with connecting information included in input cells;

(2) a second memory connected to at least one of the input digital lines for storing (A) connecting information indicative of output paths different from the output paths indicated by the information stored in said first memory and (B) internal routing information indicative of output digital lines different from those indicated by the information stored in said first memory, in association with the connecting information included in the input cells;

(3) a third memory connected to at least one of the input digital lines for storing, when a plurality of output digital lines are faulty, a plurality of internal routing information indicative of the faulty output digital lines;

(4) comparators connected to at least one of the input digital lines and also for respective one of the plurality of information stored in said third memory for comparing internal routing information read out from said first and second memories with internal routing information read out from aid third memories;

(5) a first selector connected to at least one of the input digital lines for outputting ether of connecting information and internal routing information read out from said first memory and connecting information and internal routing information read out from said second memory; and, (6) a second selector connected to at least one of the input digital lines for outputting outputs of said first selectors when connecting information of the input cells are to be rewritten and when internal routing information are to be added, and for outputting the input cells as they are at the rest of times, wherein (A) connecting information indicative of output paths and (B) internal routing information indicative of output digital lines are read out from first and second memories according to connecting information included in a cell input from an input digital line so that, when one of the output digital lines indicated by the read out internal routing information is faulty, causing one of said comparators to produce a match signal, a first selector is controlled to cause contents of the memory storing internal routing information to which no match signal is produced in all of said comparators to be output to a second selector, whereby the cell having internal routing information rewritten to indicate a normal output digital line is output from said second selector into the system and thus is output therefrom to the normal output digital line.

22. A path changing system for use in a cell switching system wherein connecting information included in cells input from a plurality of digital lines are rewritten and internal routing information are added to the cells according to the connecting information to allow said cells to be output into the system, whereby the cells are multiplexed and switched so as to be output to a plurality of predetermined output digital lines, comprising:

(1) a first memory connected to at least one of input digital lines for storing (A) a plurality of connecting information indicative of a plurality of different output paths and (B) a plurality of internal routing information indicative of a plurality of different output digital lines, in association with connecting information included in the input cells;

(2) a second memory connected to at least one of the input digital lines for storing, when a plurality of output digital lines or a plurality of output paths or both thereof are faulty, and, when the fault occurs in the output digital lines, internal routing information indicative of the faulty output digital lines and information indicative of occurrence of the faulty output digital lines and for storing, when the fault occurs in the output paths, connecting information indicative of the faulty output paths and information indicative of the occurrence of the faulty output paths;

(3) comparators connected to at least one of the input digital lines and also for respective one of the information stored in said second memory for comparing, when the information stored in said second memory indicates an output digital line fault, internal routing information read out from said first memory with internal routing information read out from said second memory and, when the information stored in said second memory indicates an output path fault, connecting information read out from said first memory with connecting information read out from said second memories;

(4) a control circuit connected to at least one of the input digital lines for controlling said first memory to read out one of the information stored in said first memory according to connecting information included in the input cells and for controlling, when receiving a match signal from said comparators, said first memory to read out information other than the information previously read out according to the connecting information included in the input cells; and, (5) a selector connected to at least one of the input digital lines for outputting an output from said first memories only when connecting information of the input cells are to be rewritten and when internal routing information are to be added and for outputting the input cells as they are at the other times, wherein one of pairs of connecting information and internal routing information indicative of output paths and output digital lines, respectively, is read out from a first memory according to connecting information included in a cell input from an input digital line so that, when an output digital line indicated by the read out internal routing information is faulty or when an output path indicated by the read out connecting information is faulty, causing one of said comparator to produce match signal, information other than the previously read out information is read out from said first memory, which in turn causes the comparator to produce no match signal with regard to the thus read out information and the thus read out information is output to said selector, and the cell having the connecting information rewritten to indicate a normal output path and having internal routing information indicative of a normal output digital line added thereto is output into the system and thus is output therefrom to the normal output digital line and the normal output path.

23. A path changing system for use in an ATM communication system wherein virtual path identifiers included in ATM cells inputted from a plurality of digital lines are rewritten and internal routing information are added to the ATM cells according to the virtual path identifiers to allow the ATM cells to be output into the system, whereby the ATM cells are multiplexed and switched to be output to a plurality of predetermined output digital lines, comprising:

(1) a first routing table connected to at least one of input digital lines for storing (A) virtual path identifiers indicative of output paths and (B) internal routing information indicative of output digital lines, in association with the virtual path identifiers included in the input ATM cells;

(2) a second routing table connected to at least one of the input digital lines for storing (A) internal routing information indicative of output digital lines different from the output digital lines indicated by the information stored in said first routing tables and (B) virtual path identifiers, in association with the virtual path identifiers included in the input ATM cells;

(3) a failure information register connected to at least one of the input digital lines for storing, when one of output digital lines is faulty, internal routing information indicative of the faulty output digital line;

(4) a comparator connected to at least one of the input digital lines for comparing internal routing information read out from said first and second routing tables with internal routing information read out from said failure information registers;

(5) a first selector circuit connected to at least one of the input digital lines for outputting either of (A) virtual path identifiers and internal routing information read out from said first routing tables and (B) virtual path identifiers and internal routing information read out from said second routing tables; and, (6) a second selector circuit connected to at least one of the input digital lines for outputting outputs from said first selector circuits only when the virtual path identifiers of the input ATM cells are to be rewritten and when internal routing information are to be added, and for outputting the input ATM cells as they are at the other times, wherein (A) virtual path identifiers indicative of output paths and (B) internal routing information indicative of output digital lines are read out according to a virtual path identifier included in an ATM cell input from an input digital line from first an second routing tables so that, when one of output digital lines indicated by the read out internal routing information is faulty, causing a comparator to produce a match signal, a first selector circuit is controlled to cause contents of a routing table storing internal routing information to which no match signal is produced in said comparator to be output to a second selector circuit, whereby an ATM cell having a virtual path identifier rewritten to indicate a normal output path and having internal routing information indicative of a normal output digital line added thereto is output into the system from said second selector circuit to the normal output digital line.

24. A path changing system for use in an ATM communication system wherein virtual path identifiers included in ATM cells input from a plurality of digital lines are rewritten and internal routing information are added to the ATM cells according to the virtual path identifiers to allow the ATM cells to be output into the system, whereby the ATM cells are multiplexed and switched to be output to a plurality of predetermined output digital lines, comprising:

(1) a first routing table connected to at least one of input digital lines for storing (A) virtual path identifiers indicative of output paths and (B) internal routing information indicative of output digital lines, in association with the virtual path identifiers included in the input ATM cells;

(2) a second routing table connected to at least one of the input digital lines for storing (A) virtual path identifiers indicative of output paths different from the output paths indicated by the information stored in said first routing tables and (B) internal routing information, in association with the virtual path identifiers included in the input ATM cells;

(3) a failure information register connected to at least one of the input digital lines for storing, when one of the output paths is faulty, a virtual path identifier indicative of the faulty output path;

(4) a comparator connected to at least one of the input digital lines for comparing virtual path identifiers read out from said first and second routing tables with virtual path identifiers read out from said failure information registers;

(5) a first selector circuit connected to at least one of the input digital lines for outputting one of (A) virtual path identifiers and internal routing information read out from said first routing tables and (B) virtual path identifiers and internal routing information read out from said second routing tables; and, (6) a second selector circuits connected to at least one of the input digital lines for outputting outputs from said first selector circuits only when the virtual path identifiers of input ATM cells are to be rewritten and when internal routing information are to be added, and for outputting the input ATM cells as they are at the other times, wherein virtual path identifiers indicative of output paths and internal routing information are read out according to a virtual path identifier included in an ATM cell input from an input digital line from first and second routing tables so that, when an output path indicated by the read out virtual path identifier is faulty, said comparator producing a match signal, a first selector circuit is controlled to cause contents of a routing table storing virtual path identifier to which no match signal is produced in a comparator to be output to a second selector circuit, whereby the ATM cell having the virtual path identifier rewritten to indicate a normal output path and having internal routing information indicating a normal output digital line added thereto is output into the system from said second selector circuit to allow the ATM cell to be output therefrom to the normal output path.

25. A path changing system for use in an ATM communication system wherein virtual path identifiers included in ATM cells inputted from a plurality of digital lines are rewritten and internal routing information are added to the ATM cells according to the virtual path identifiers so as to allow the ATM cells to be outputted into the system, whereby the ATM cells are multiplexed and switched so as to be output to a plurality of predetermined output digital lines, comprising:

(1) a first routing table connected to at least one of input digital lines for storing virtual path identifiers indicative of output paths and internal routing information indicative of output digital lines, in association with virtual path identifiers included in the input ATM cells;

(2) a second routing table connected to at least one of the input digital lines for storing (A) virtual path identifiers indicative of output paths different from the output paths indicated by the information stored in said first routing tables and (B) internal routing information indicative of output digital lines different from those indicated by the information stored in the first routing tables, in association with the virtual path identifiers included in the input ATM cells;

(3) a third routing table connected to at least one of the input digital lines for storing (A) virtual path identifiers indicative of output paths different from the output paths indicated by the information stored in said first and second routing tables and (B) internal routing information indicative of output digital lines different from those indicated by the information stored in said first and second routing tables, in association with the virtual path identifiers included in the input ATM cells;

(4) a first failure information register connected to at least one of the input digital lines for storing, when one of output digital lines is faulty, internal routing information indicative of the faulty output digital line;

(5) a second failure information register connected to at least one of the input digital lines for storing, when one of output paths is faulty, a virtual path identifier indicative of the faulty output path;

(6) a first comparator connected to at least one of the input digital lines for comparing virtual path identifiers read out from said first, second and third routing tables with virtual path identifiers read out from said second failure information register;

(7) a second comparator connected to at least one of the input digital lines for comparing internal routing information read out from said first, second and third routing tables with internal routing information read out from said first failure information register;

(8) a first selector circuit connected to at least one of the input digital lines for outputting one of (A) virtual path identifiers and internal routing information read out from said first routing table and (B) virtual path identifiers and internal routing information read out from said second routing table;

(9) a second selector circuit connected to at least one of the input digital lines for outputting one of (A) an output of said first selector circuits and (B) virtual path identifiers and internal routing information read out from said third routing tables; and,

(10) a third selector circuit connected to at least one of the input digital lines for outputting outputs from said second selector circuits only when virtual path identifiers of the input ATM cells are to be rewritten and only when internal routing information is to be added and for outputting the input ATM cells as they are at the other timings, wherein (A) virtual path identifiers indicative of output paths and (B) internal routing information indicative of output digital lines are read out according to a virtual path identifier included in an ATM cell input from an input digital line from said first and second routing tables so that, when one of the output paths indicated by the read-out virtual path identifiers is faulty, said first comparator producing a match signal, said first selector circuit is controlled to cause contents of the routing table storing virtual path identifiers to which no match signal is produced in associated first comparator to be output to associated second selector circuit, and so that, the output digital line indicated by the internal routing information stored in the routing table storing virtual path identifier to which no match signal is produced in said first comparator and the output digital line indicated by the internal routing information read out from said second routing table are faulty, causing said second comparator to produce a match signal, said second selector circuit is controlled to cause contents of the routing table storing virtual path identifiers to which no match signal is produced in said second comparator to be output to an associated third selector circuit, whereby the ATM cell having the virtual path identifier rewritten to indicate a normal output path and having internal routing information indicating a normal output digital line added thereto is output into the system from said second selector circuit to the normal output path.

26. A path changing system for use in an ATM communication system wherein virtual path identifiers included in ATM cells input from a plurality of digital lines are rewritten and internal routing information are added to the ATM cells according to the virtual path identifiers so as to allow the ATM cells to be output into the system, whereby the ATM cells are multiplexed and switched to a plurality of predetermined output digital lines, comprising:

(1) a first routing table connected to at least one of input digital lines for storing (A) virtual path identifiers indicative of output paths and (B) internal routing information indicating output digital lines, in association with the virtual path identifiers included in the input ATM cells;

(2) a second routing table connected to at least one of the input digital lines for storing (A) virtual path identifiers indicative of output different from the output paths indicated by the information stored in said first routing tables and (B) internal routing information indicative of output digital lines different from those indicated by the information stored in said first routing tables, in association with the virtual path identifiers included in the input ATM cells;

(3) a failure information register connected to at least one of the input digital lines for storing, when a fault occurs in one of the output digital lines, internal routing information indicative of the output digital line fault and information indicative of said fault being in the output digital lines and also storing, when a fault occurs in one of the output paths, virtual path identifiers indicative of the faulty output virtual path and information indicative of said faulty occurrence being in the output paths;

(4) a comparator connected to at least one of the input digital lines for comparing, when the information stored in said failure information register indicates the output digital line fault, internal routing information read out from said first and second routing tables with the internal routing information read out from said failure information register and for comparing, when the information stored in said failure information register indicates an output path fault, virtual path identifiers read out from said first and second routing tables with the virtual path identifiers read out from said failure information register;

(5) a first selector circuit connected to at least one of the input digital lines for outputting either of virtual path identifiers and internal routing information read out from said first routing tables or virtual path identifiers and internal routing information read out from said second routing tables; and, (6) a second selector circuit connected to at least one of the input digital lines for outputting outputs from said first selector circuits only when the virtual path identifiers of the input ATM cells are to be rewritten and only when the internal routing information are to be added and for outputting the input ATM cells as they are at the other timings;

wherein (A) virtual path identifiers indicative of the output paths and (B) internal routing information indicative of output digital lines are read out according to a virtual path identifier included in an ATM cell input from an input digital line by associated first and second routing tables so that, when one of the output digital lines indicated by the read out internal routing information is faulty or when one of the output paths indicated by the read out virtual path identifier is faulty, causing an associated comparator to produce a match signal, an associate first selector circuit is controlled to cause contents of a routing table storing internal routing information or virtual path identifiers to which no match signal is produced in said comparator to be output to a second selector circuit, whereby the ATM cell having a virtual path identifier rewritten to indicate a normal output path and having internal routing information indicating a normal output digital line added thereto is output from said second selector circuit into the system and thus is output therefrom to the normal output path.

27. A path changing system for use in an ATM communication system wherein virtual path identifiers included in ATM cells input from a plurality of digital lines are rewritten and internal routing information are added to the ATM cells according to the virtual path identifiers to allow the ATM cells to be output into the system, whereby the ATM cells are multiplexed and switched to be output to a plurality of predetermined output digital lines, comprising:

(1) a first routing table connected to at least one of input digital lines for storing (A) virtual path identifiers indicative of output paths and (B) internal routing information indicative of output digital lines, in association with the virtual path identifiers included in the input ATM cells;

(2) a second routing table connected to at least one of the input digital lines for storing (A) virtual path identifiers indicative of output paths different from the output paths indicated by the information stored in said first routing tables and (B) internal routing information indicative of output digital lines different from those indicated by the information stored in said first routing tables, in association with the virtual path identifiers included in the input ATM cells;

(3) a failure information register connected to at least one of the input digital lines for storing, when a fault occurs in the plurality of the output digital lines, a plurality of internal routing information indicative of output digital lines;

(4) comparators connected to at least one of the input digital lines and also for said failure information registers for comparing the internal routing information read out from said first and second routing tables with internal routing information read out from said failure information registers;

(5) a first selector circuit connected to at least one of the input digital lines for outputting either one of (A) virtual path identifiers and internal routing information read out from said first tables and (B) virtual path identifiers and internal routing information read out from said second routing tables; and, (6) a second selector circuit connected to at least one of the input digital lines for outputting an output of said first selector circuits only when the virtual path identifiers of the input ATM cells are to be rewritten and only when the internal routing information are added, and for outputting the input ATM cells as they are at the other times, wherein (A) virtual path identifiers indicative of output paths and (B) internal routing information indicative of output digital lines are read out from said first and second routing tables according to a virtual path identifier included in an ATM cell input from an input digital line so that, when one of the output digital lines indicated by the read out internal routing information is faulty, causing said comparator to produce a match signal, an associated first selector circuit is controlled to cause contents of a routing table storing the internal routing information to which no match signal is produced in any of said comparators to be output to an associated second selector circuit, whereby the ATM cell having the virtual path identifier rewritten to indicate a normal output path and having internal routing information indicating a normal output digital line added thereto is output from said associated second selector circuit into the system and thus is output therefrom to the normal output digital line.

28. A path changing system for use in an ATM communication system wherein virtual path identifiers included in ATM cells input from a plurality of digital lines are rewritten and internal routing information are added to the ATM cells according to the virtual path identifiers to allow said ATM cells to be output into the system, whereby the ATM cells are multiplexed and switched to be output to a plurality of predetermined output digital lines, comprising:

(1) a routing table connected to at least one of input digital lines for storing (A) a plurality of the virtual path identifiers indicative of a plurality of different output paths and (B) a plurality of internal routing information indicative of a plurality of different output digital lines, in association with virtual path identifiers included in the input ATM cells;

(2) a failure information register connected to at least one of the input digital lines, for storing, when a plurality of output digital lines or a plurality of output paths or both thereof are faulty, and, when the fault occurs in the output digital lines, internal routing information indicative of the faulty output digital lines and information indicative of the occurrence of the faulty output virtual paths and for storing, when the fault occurs in the output virtual paths, virtual path identifiers indicative of the faulty output paths and information indicative of the occurrence of the faulty output paths;

(3) comparators connected to at least one of the input digital lines and also for respective one of information stored in said failure information registers indicates the output digital line fault, internal routing information read out from said routing tables with internal routing information read out from said failure information registers and, when the information stored in said failure registers indicates the output path fault, virtual path identifiers read out from said routing tables with virtual path identifiers read out from said failure information registers;

(4) a control circuit connected to at least one of the input digital lines for controlling said routing tables to read out one of the information stored in said routing tables according to the virtual path identifiers included in the input ATM cells and for controlling, when receiving a match signal from said comparators, said routing tables to read out information other than the information previously read out according to the virtual path identifiers included in the input ATM cells; and, (5) a selector circuit connected to at least one of the input digital lines for outputting an output from said routing tables only when the virtual path identifiers of the input ATM cells are to be rewritten and only when the internal routing information are added, and for outputting the input ATM cells as they are at other timings, wherein one of the virtual path identifiers indicative of output paths and internal routing information indicative of output digital lines are read out from said routing tables according to the virtual path identifiers included in an ATM cell input from an input digital line so that, when one of the output digital lines indicated by the read out internal routing information is faulty or when one of the output paths indicated by the read out virtual path identifiers is faulty, causing an associated comparator to produce a match signal, information other than previously read out information is read out from said routing tables and is output to an associated selector circuit and the ATM cell having a virtual path identifier rewritten to indicate a normal output path and having internal routing information indicating a normal output digital line added thereto is output into the system and thus is output therefrom to the normal output digital line.

29. A path changing method for use in a cell-based communication network comprising a plurality of cell switching systems wherein connecting information included in cells input from a plurality of digital lines are rewritten and internal routing information are added to the cells according to the connecting information to allow said cells to be output into the system, whereby the cells are multiplexed and switched to a plurality of predetermined output digital lines, and including a managing apparatus for managing said plurality of cell switching systems and a plurality of transmission lines, each of said plurality of cell switching systems having a path changing system the method comprising:

precedently loading (A) internal routing information indicative of output digital lines different from output digital lines stored in a first memory and (B) connecting information on output cells, into each of a plurality of second memories provided in each cell switching system, storing, in a third memory connected to at least one of the input digital lines when one of the output digital lines is faulty, internal routing information indicative of the faulty output digital line;

comparing internal routing information read out from said first and second memories with internal routing information read out from said third memory;

outputting either of connecting information and internal routing information read out from said first memory and connecting information and internal routing information read out from said second memory; and, outputting an output only when connecting information of the input cells are to be rewritten and only when internal routing information are to be added and for outputting the input cells, when an output digital line of a cell switching system is faulty, selecting a normal output digital line by using (A) interstation failure information transmitted and received between associated cell switching systems and (B) said path changing system, for performing communication in a cell switching network by taking an alternate transmission line or an alternate path in the transmission line, whereby the cell having the connecting information rewritten and having internal routing information added thereto to indicate a normal output digital line is output into the system to allow said cell to be output therefrom to the normal output digital line.

30. A path changing method for use in a cell-based communication network comprising a plurality of cell switching systems wherein connecting information included in cells input from a plurality of digital lines are rewritten and internal routing information are added to the cells according to the connecting information to allow said cells to be output into the system, whereby the cells are multiplexed and switched so as to be output to a plurality of predetermined output digital lines, and a managing apparatus for managing said plurality of cell switching systems and transmission lines, each of said plurality of cell switching systems having a path changing system comprising:

precedently loading (A) connecting information indicative of output paths different from output paths indicated by information stored in a first memory and (B) internal routing information, into each one of a plurality of second memories provided in each cell switching system and storing, in a third memory connected to at least one of the input digital lines when one of the output paths is faulty, connecting information indicative of the faulty output path;

comparing the connecting information read out from said first and second memories with the connecting information read out from said third memory;

outputting either of (A) connecting information and internal routing information read out from said first memory and (B) connecting information and internal routing information read out from said second memory; and, outputting outputs only when connecting information of the input cells are to be rewritten When internal routing information is to be added and for outputting the input cells as they are at the other timings, when an output path in a cell switching system is faulty, selecting a normal output path by using (A) an interstation failure information transmitted between associated cell switching systems and (B) said path changing system for performing communication in a cell switching network by taking an alternate transmission line or an alternate path in the transmission line, whereby the cell having the connecting information rewritten to indicate a normal output connection and having internal routing information added thereto is output into the system to allow said cell to be output therefrom to the normal output path.

31. In a cell-based communication network comprising a plurality of cell switching systems wherein connecting information included in cells input from a plurality of digital lines are rewritten and internal routing information are added to the cells according to the connecting information to allow said cells to be output into the system, whereby the cells are multiplexed and switched so as to be output to a plurality of predetermined output digital lines, and a managing apparatus for managing said plurality of cell switching systems and transmission lines, each of said plurality of cell switching systems having a path changing system for rerouting data, the improvement comprising:

precedently loading (A) connecting information indicative of output paths different from output paths indicated by information stored in a first memory and (B) internal routing information indicative of output digital lines different from output digital lines indicated by the information stored in said first memory, into each of a plurality of second memories provided in each cell switching system;

precedently loading (A) connecting information indicative of output paths different from the output paths indicated by the information stored in said first and second memories and (B) internal routing information indicative of output digital lines different from the output digital lines indicated by the information stored in said first and second memories, into each of a plurality of third memories of each cell switching system;

storing, in a fourth memory connected to at least one of the input digital lines when one of the output paths is faulty, internal routing information indicative of the faulty output path;

storing, in a fifth memory connected to at least one of the input digital lines, connecting information indicative of one the output connections which is faulty; and when a fault is detected in an output digital line or an output path in a cell switching system, selecting a normal output digital line or output path by using (A) interstation failure information transmitted and received between associated cell switching systems and (B) said path changing system for performing communication in a cell switching network by taking an alternate transmission line or alternate path in the transmission line, whereby the cell having the connecting information rewritten to indicate a normal output path and having internal routing information added thereto is outputted into the system to the normal output path.

32. A path changing method for use in a cell-based communication network comprising a plurality of cell switching systems wherein connecting information included in cells inputted from a plurality of digital lines are rewritten and internal routing information are added to the cells according to the connecting information to allow said cells to be output into the system, whereby the cells are multiplexed and switched to a plurality of predetermined output digital lines, and a managing apparatus for managing said plurality of cell switching systems and transmission lines, each of said plurality of cell switching systems having a path changing system comprising:

precedently loading (A) connecting information indicative of output paths different from output paths indicated stored in a first memory and (B) internal routing information indicative of output digital lines different from output digital lines stored in said first memory, into each of a plurality of second memories in each cell switching system; and storing, in a third memory connected to at least one of the input digital lines when a fault occurs in one of the output digital lines, (A) internal routing information indicative of the faulty output digital line and (B) information indicative of said fault in the output digital lines and also storing, when a fault occurs in one of the output paths, connecting information indicative of said fault in the output paths;

comparing, when the information stored in said third memory indicates an output digital line fault, internal routing information read out from said first and second memories with internal routing information read out from said third memory and for comparing, when the information stored in said third memory means indicates an output path fault, connecting information read out from said first and second memories with connecting information read out from said third memory;

outputting, from a first selector, either of connecting information and internal routing information read out from said first memory and connecting information and internal routing information read out from said second memory; and, outputting outputs from said first selector only when connecting information Of the input cells are to be rewritten and only when internal routing information are to be added and for outputting the input cells as they are at the other timings, when a communication fault is detected in an output digital line or an output path in a cell switching system, selecting a normal output digital line or output path by using (A) interstation failure information transmitted and received between associated cell switching systems and (B) the path changing system to continue communication by taking an alternate transmission line or alternate path in the transmission line, whereby the cell having connecting information rewritten to indicate a normal output digital line and output path and having internal routing information added thereto, is outputted into the system and thus is outputted therefrom to the normal output digital line or normal output path.

33. A path changing method for use in a cell-based communication network comprising a plurality of cell switching systems wherein connecting information included in cells input from a plurality of digital lines are rewritten and internal routing information are added to the cells according to the connecting information to allow said cells to be output into the system, whereby the cells are multiplexed and switched so as to be output to a plurality of predetermined output digital lines, and a managing apparatus for managing said plurality of cell switching systems and transmission lines, each of said plurality of cell switching systems having a path changing system for rerouting communication lines, comprising:

precedently loading (A) connecting information indicative of output paths different from output paths indicated by the information stored in a first memory and (B) internal routing information indicative of output digital lines different from those indicated by information stored in said first memory, into each of a plurality of second memories of each cell switching system and storing, in a third memory connected to at least one of the input digital lines when a plurality of output digital lines are faulty, a plurality of internal routing information indicative of the faulty output digital lines;

comparing internal routing information read out from said first and second memories with internal routing information read out from said third memories;

outputting, from a first selector, either of connecting information and internal routing information read out from said first memory and connecting information and internal routing information read out from said second memory; and outputting outputs of said first selector when connecting information of the input cells are to be rewritten and when internal routing information are to be added, and for outputting the input cells as they are at other times, when a digital output line in the cell switching system is faulty, said cell switching system selecting a normal output digital line by using (A) interstation failure information transmitted between associated cell switching systems and (B) said path changing system, to thereby perform communication in a cell switching network by taking an alternate transmission line or alternate path in a transmission line, whereby the cell having internal routing information rewritten to indicate a normal output digital line is output into the system and thus is output therefrom to the normal output digital line.

34. A path changing method for use in a cell-based communication network comprising a plurality of cell switching systems wherein connecting information included in cells input from a plurality of digital lines are rewritten and internal routing information are added to the cells according to the connecting information to allow said cells to be output into the system, whereby the cells are multiplexed and switched so as to be output to a plurality of predetermined output digital lines, and a managing apparatus for managing said plurality of cell switching systems and transmission lines, each of said plurality of cell switching systems having a path changing system for rerouting data comprising:

precedently loading (A) a plurality of connecting information indicative of a plurality of different output paths and (B) a plurality of internal routing information indicative of a plurality of different output digital lines, into each of a plurality of first memories of each cell switching system; and storing, in a second memory connected to at least one of the plurality of digital lines when a plurality of output digital lines or a plurality of output paths or both thereof are faulty, and, when the fault occurs in the output digital lines, internal routing information indicative of the faulty output digital lines and information indicative of occurrence of the faulty output digital lines and for storing, when the fault occurs in the output paths, connecting information indicative of the faulty output paths and information indicative of the occurrence of the faulty output paths;

comparing, when the information stored in said second memory indicates an output digital line fault, internal routing information read out from said first memory with internal routing information read out from said second memory and, when the information stored in said second memory indicates an output path fault, connecting information read out from said first memory with connecting information read out from said second memories;

controlling said first memory to read out one of the information stored in said first memory according to connecting information included in the input cells and controlling, when receiving a match signal, said first memory to read out information other than the information previously read out according to the connecting information included in the input cells; and, outputting an output from said first memories only when connecting information of the input cells are to be rewritten and when internal routing information are to be added and for outputting the input cells as they are at the other times, when at least one of a digital output line and an output path in the cell switching system is faulty, said cell switching system selecting at least one of a normal output digital line and a normal output path by using (A) interstation failure information transmitted between associated cell switching systems and (B) said path changing system for continuing communication in a cell switching network by taking an alternate transmission line or alternate path in a transmission line, and the cell having the connecting information rewritten to indicate a normal output path and having internal routing information indicative of a normal output digital line added thereto is output into the system and thus is output therefrom to the normal output digital line and the normal output path.

35. A path changing method for use in an ATM communication network comprising a plurality of ATM communication apparatuses wherein virtual path identifiers included in ATM cells inputted from a plurality of digital lines are rewritten and internal routing information are added to the ATM cells according to the virtual path identifiers to allow the ATM cells to be output into the system, whereby the ATM cells are multiplexed and switched to be output to a plurality of predetermined output digital lines, and a managing apparatus for managing said plurality of ATM communication apparatus and transmission lines, each of said plurality of ATM communication apparatus having a path changing system for rerouting data communications, comprising:

precedently loading (A) internal routing information indicative of output digital lines different from output digital lines indicated by information previously stored in a plurality of first routing tables and (B) virtual path identifiers, into each of a plurality of second routing tables provided in each ATM communication apparatus;

storing, in a failure information register connected to at least one of the plurality of digital lines when one of output digital lines is faulty, internal routing information indicative of the faulty output digital line; and, when a fault is detected in an output digital line of an ATM communication apparatus, said ATM communication apparatus selecting a normal output digital line by using (A) interstation failure information transmitted and received between associated ATM communication apparatuses and (B) said path changing system, and performing data communication in an ATM communication network by taking an alternate transmission line or alternate path in a transmission line, whereby an ATM cell having a virtual path identifier rewritten to indicate a normal output path and having internal routing information indicative of a normal output digital line added thereto is output into the system to the normal output digital line.

36. A path changing method for use in an ATM communication network comprising a plurality of ATM communication apparatus wherein virtual path identifiers included in ATM cells input from a plurality of digital lines are rewritten and internal routing information are added to the ATM cells according to the virtual path identifiers to allow the ATM cells to be output into the system, whereby the ATM cells are multiplexed and switched to be output to a plurality of predetermined output digital lines, and a managing apparatus for managing said plurality of ATM communication apparatus and transmission lines, each of said plurality of ATM communication apparatus having a path changing system comprising:

precedently loading (A) virtual path identifiers indicative of output paths different from output paths indicated by information previously stored in a plurality of first routing tables and (B) internal routing information, into each of a plurality of second routing tables provided in each ATM communication apparatus;

storing, in a failure information register connected to at least one of the plurality of digital lines when one of the output paths is faulty, a virtual path identifier indicative of the faulty output path; and, when a fault is detected in a virtual path of an ATM communication apparatus, said ATM communication apparatus selecting a normal output path by using (A) interstation failure information transmitted and received between ATM communication apparatuses involved and (B) said path changing system, to thereby perform communication in the ATM communication network, by taking an alternate path, whereby the ATM cell having the virtual path identifier rewritten to indicate a normal output path and having internal routing information indicating a normal output digital line added thereto is output into the system from said second selector circuit to allow the ATM cell to be output therefrom to the normal output path.

37. A path changing method for use in an ATM communication network comprising a plurality of ATM communication apparatuses wherein virtual path identifiers included in ATM cells inputted from a plurality of digital lines are rewritten and internal routing information are added to the ATM cells according to the virtual path identifiers so as to allow the ATM cells to be outputted into the system, whereby the ATM cells are multiplexed and switched so as to be output to a plurality of predetermined output digital lines, a managing apparatus for managing said plurality of ATM communication apparatus and transmission lines, each of said plurality of ATM communication apparatus having a path changing system comprising precedently loading (A) virtual path identifiers of output paths different from output paths indicated by information previously stored in a plurality of first routing tables and (B) internal routing information indicative of output digital lines different from those indicated by the information stored in said plurality of first routing tables, into each of a plurality of second routing tables provided in each ATM communication apparatus and, precedently loading (A) virtual path identifiers indicative of output paths different from the output paths indicated by the information stored in said first and second routing tables and (B) internal routing information indicative of output digital lines different from those indicated by the information stored in said first and second routing tables, into each of a plurality of third routing tables provided in each of said plurality of ATM communication apparatuses;

storing, in a first failure information register connected to at least one of the plurality of digital lines when one of the output digital lines is faulty, internal routing information indicative of the faulty output digital line;

storing, in a second failure information register connected to at least one of the plurality of digital lines when one of the output paths is faulty, a virtual path identifier indicative of the faulty output path; and, when an output digital line of an ATM communication apparatus is faulty, said ATM communication apparatus selecting a normal output path by using (A) interstation failure information transmitted and received between ATM communication apparatuses involved and (B) said path changing system, to thereby perform communication in an ATM communication network by taking an alternate path, whereby the ATM cell having the virtual path identifier rewritten to indicate a normal output path and having internal routing information indicating a normal output digital line added thereto is output into the system to the normal output path.

38. A path changing method for use in an ATM communication network comprising a plurality of ATM communication apparatuses wherein virtual path identifiers included in ATM cells input from a plurality of digital lines are rewritten and internal routing information are added to the ATM cells according to the virtual path identifiers so as to allow the ATM cells to be output into the system, whereby the ATM cells are multiplexed and switched to a plurality of predetermined output digital lines, and a managing apparatus for managing said plurality of ATM communication apparatus and transmission lines, each of said plurality of ATM communication apparatuses having a path changing system, said managing apparatus precedently loading (A) virtual path identifiers indicative of output paths different from output paths indicated by information stored in first routing tables and (B) internal routing information indicative of output digital lines different from those indicated by the information stored in said first routing tables, into each of a plurality of second routing tables provided in each ATM communication apparatus, storing, in a failure information register connected to at least one of the plurality of digital lines when a fault occurs in one of the output digital lines, internal routing information indicative of the output digital line fault and information indicative of said fault being in the output digital lines and also storing, when a fault occurs in one of the output paths, virtual path identifiers indicative of the faulty output virtual path and information indicative of said faulty occurrence being in the output paths; and when an output digital line or output path in an ATM communication apparatus is faulty, said ATM communication apparatus selecting a normal output path by using interstation failure information exchanged between ATM communication apparatuses involved and using said path changing system, to thereby perform communication in the ATM communication network by taking an alternate path, whereby the ATM cell having a virtual path identifier rewritten to indicate a normal output path and having internal routing information indicating a normal output digital line added thereto is output from said second selector circuit into the system and thus is output therefrom to the normal output path.

39. A path changing method for use in an ATM communication network comprising a plurality of ATM communication apparatuses wherein virtual path identifiers included in ATM cells input from a plurality of digital lines are rewritten and internal routing information are added to the ATM cells according to the virtual path identifiers to allow the ATM cells to be output into the system, whereby the ATM cells are multiplexed and switched to be output to a plurality of predetermined output digital lines, and a managing apparatus for managing said ATM communication apparatuses and transmission lines, each of said ATM communication apparatuses having a path changing system comprising:

precedently loading (A) virtual path identifiers indicative of output paths different from output paths indicated by information stored in first routing tables and (B) internal routing information indicative of output digital lines different from those indicated by the information stored in said first routing tables, into each of a plurality of second routing tables in each ATM communication apparatus, and storing, in a failure information register connected to at least one of the plurality of digital lines when a fault occurs in the plurality of the output digital lines, a plurality of internal routing information indicative of output digital lines;

comparing the internal routing information read out from said first and second routing tables with internal routing information read out from said failure information registers;

when a fault is detected in an output digital line in an ATM communication apparatus, selecting a normal output digital line by using (A) interstation failure information transmitted between ATM communication apparatuses involved and (B) said path changing system, to thereby perform communication in the ATM communication network by exchanging data over an alternate transmission line, whereby the ATM cell having the virtual path identifier rewritten to indicate a normal output path and having internal routing information indicating a normal output digital line added thereto is output into the system and thus is output therefrom to the normal output digital line.

40. A path changing method for use in an ATM communication network comprising a plurality of ATM communication apparatuses wherein virtual path identifiers included in ATM cells input from a plurality of digital lines are rewritten and internal routing information are added to the ATM cells according to the virtual path identifiers to allow said ATM cells to be output into the system, whereby the ATM cells are multiplexed and switched to be output to a plurality of predetermined output digital lines, and a managing apparatus for managing said ATM communication apparatuses and transmission lines, each of said ATM communication apparatuses having a path changing system comprising:

precedently loading (A) a plurality of virtual path identifiers indicative of different output paths and (B) a plurality of internal routing information indicative of a plurality of different output digital lines, into each of a plurality of first routing tables included in each of said plurality of ATM communication apparatuses, and storing, in a failure information register connected to at least one of the plurality of digital lines when a plurality of output digital lines or a plurality of output paths or both thereof are faulty, and, when the fault occurs in the output digital lines, internal routing information indicative of the faulty output digital lines and information indicative of the occurrence of the faulty output virtual paths and for storing, when the fault occurs in the output virtual paths, virtual path identifiers indicative of the faulty output paths and information indicative of the occurrence of the faulty output paths;

when a fault occurs in at least one of an output digital line and an output path in an ATM communication apparatus, said ATM communication apparatus selecting a normal output digital line by using (A) interstation failure information transmitted between ATM communication apparatuses involved in said fault and (B) said path changing system, to thereby continue data communication in the ATM communication network by exchanging data over an alternate transmission line, and the ATM cell having a virtual path identifier rewritten to indicate a normal output path and having internal routing information indicating a normal output digital line added thereto is output into the system and thus is output therefrom to the normal output digital line.

* * * * *

UNITED STATES PATENT AND TRADEMARK OFFICE
CERTIFICATE OF CORRECTION

PATENT NO. : 5,600,630
DATED : February 4, 1997
INVENTOR(S) : Masataka Takano, et al.

It is certified that error appears in the above-indentified patent and that said Letters Patent is hereby corrected as shown below:

Claim 3, column 12, line 55, delete "paths" and insert therefor --path--.

Claim 5, column 13, line 51, delete "said output channel, said output channel" and insert therefor --said output path, said output channel--.

Claim 21, column 23, line 21, delete "ether" and insert therefor --either--.

Claim 23, column 25, line 37, delete "an" and insert therefor --and--.

Claim 30, column 32, line 31, after "rewritten" add --and only--.

Signed and Sealed this

Twenty-second Day of July, 1997

Attest:

BRUCE LEHMAN

*Attesting Officer*  *Commissioner of Patents and Trademarks*